United States Patent [19]

Zbikowski et al.

[11] Patent Number: 5,497,492
[45] Date of Patent: Mar. 5, 1996

[54] SYSTEM AND METHOD FOR LOADING AN OPERATING SYSTEM THROUGH USE OF A FIRE SYSTEM

[75] Inventors: Mark J. Zbikowski, Woodinville; Alan R. Whitney; Rajen J. Shah, both of Bellevue; Bryan M. Willman, Kirkland; J. Gordon Letwin, Redmond, all of Wash.

[73] Assignee: Microsoft Corporation, Redmond, Wash.

[21] Appl. No.: 118,474

[22] Filed: Sep. 8, 1993

Related U.S. Application Data

[63] Continuation of Ser. No. 578,093, Sep. 4, 1990, abandoned.
[51] Int. Cl.[6] .................................................. G06F 15/177
[52] U.S. Cl. ............................. 395/700; 364/DIG. 1; 364/280.2
[58] Field of Search ............................... 395/600, 700

[56] References Cited

U.S. PATENT DOCUMENTS

| | | | |
|---|---|---|---|
| 4,590,557 | 5/1986 | Lillie ........................................ | 395/700 |
| 4,626,986 | 12/1986 | Mori ....................................... | 395/700 |
| 4,649,479 | 3/1987 | Advani et al. ........................ | 395/700 |
| 4,663,707 | 5/1987 | Dawson ................................. | 395/700 |
| 5,001,628 | 3/1991 | Johnson et al. ....................... | 395/600 |
| 5,014,192 | 5/1991 | Mansfield et al. .................... | 395/600 |
| 5,134,580 | 7/1992 | Bertram et al. ....................... | 395/650 |
| 5,136,709 | 8/1992 | Shirakabe ............................. | 395/700 |
| 5,136,713 | 8/1992 | Bealkowski et al. ................. | 395/700 |
| 5,142,680 | 8/1992 | Ottman et al. ........................ | 395/700 |
| 5,146,568 | 9/1992 | Flaherty et al. ....................... | 395/325 |
| 5,165,018 | 11/1992 | Simor ..................................... | 395/300 |
| 5,307,497 | 4/1994 | Feigenbaum et al. ................ | 395/700 |

OTHER PUBLICATIONS

Tanenbaum, A., Operating Systems: Design & Implementation, 1987, pp. 226–227, 299–302, 306–311, 327–328.
Mason, W., "Distributed Processing: The State of the Art," BYTE, Nov. 1987, pp. 291–329.

*Primary Examiner*—Thomas G. Black
*Assistant Examiner*—John C. Loomis
*Attorney, Agent, or Firm*—Seed and Berry

[57] ABSTRACT

A method in a computer system for loading an operating system into memory through use of a file system that is stored on secondary storage. The operating system is stored on secondary storage as files with file names. Before the operating system is loaded into memory, a bootstrap program loads the file system from secondary storage into memory. The file system is stored at locations in secondary storage that are known to the bootstrap program. The file system also has a mapping of file names of operating system files to locations in secondary storage that contain the operating system files. After loading the file system, the bootstrap program requests the loaded file system to load the operating system files by specifying the file names of the operating system files to be loaded. In response to the request, the file system uses the mapping to retrieve the locations in secondary storage of the operating system files specified by the file names. The loaded file system then loads the operating system files into memory from the retrieved locations of secondary storage. Control can then be transferred to the operating system files.

20 Claims, 24 Drawing Sheets

| |
|---|
| FS_NAME |
| FS_ATTACH |
| FS_CHDIR |
| FS_CHGFILEPTR |
| FS_CLOSE |
| FS_COPY |
| FS_DELETE |
| FS_EXIT |
| FS_FILEATTRIBUTE |
| FS_FILEINFO |
| FS_FILEIO |
| FS_FINDCLOSE |
| FS_FINDFIRST |
| FS_FINDNEXT |
| FS_FINDNOTIFYCLOSE |
| FS_FINDNOTIFYFIRST |
| FS_FINDNOTIFYNEXT |
| FS_FSINFO |
| FS_INIT |
| FS_IOCTL |
| FS_MKDIR |
| FS_MOUNT |
| FS_MOVE |
| FS_NEWSIZE |
| FS_NMPIPE |
| FS_OPENCREATE |
| FS_PATHINFO |
| FS_PROCESSNAME |
| FS_READ |
| FS_RMDIR |
| FS_SETSWAP |
| FS_WRITE |
| FS_COMMIT |
| FS_FSCTL |
| FS_FLUSHBUF |
| FS_SHUTDOWN |

*FIG. 7* ically indivisible unit during the OS construction. There is a
SYSTEM AND METHOD FOR LOADING AN OPERATING SYSTEM THROUGH USE OF A FILE SYSTEM

CROSS-REFERENCE TO RELATED APPLICATION

This application is a continuation of U.S. patent application Ser. No. 07/578,093, filed Sep. 4, 1990, now abandoned.

FIELD OF THE INVENTION

This invention relates to improved methods providing access to mass storage media with differing data organization.

BACKGROUND OF THE INVENTION

Intrinsic to the operation of modern computers is the fundamental or core software known as the "operating system" (OS). The OS is responsible for providing an environment, in conjunction with the physical hardware attached to the computer system, in which programs may run. One major attribute of an OS is the degree to which it can isolate the programs (often called "applications") that are expected to execute on the computer system from the actual operational details of the hardware attached to the computer system.

For example, it would be undesirable for an application to have to know the details of a display (video terminal or paper-based Teletype) attached to the computer. If a new type of display were developed, applications that predated this new hardware would be unable to utilize it since they were not constructed with the parameters of the new device. This would provide a disincentive for hardware innovation as well as a disincentive for taking advantage of very specific features of a particular device. This "working to a lowest common denominator" is a further hindrance to the marketability and saleability of computer systems.

All OS's today implement a large degree of such isolation, allowing applications to be written and executed on a large variety of hardware configurations. This isolation has been achieved by the organization of the operating system into a kernel, filing systems, and device drivers. The kernel contains common services that applications can access. These services convert requests by applications into requests for data transfer from device drivers. Such requests come at the level of read data from a keyboard, write data to a display or printer, read data from a particular location within a mass storage medium or write data to a particular location within a mass storage medium. From the standpoint of displays, keyboards, and printers, such isolation occurs very naturally. Mass storage presents a significant problem in that providing a means for locating or naming data in a fashion that is sufficiently isolated from the device requires a significant body of code. This code that provides a naming/location service for applications to use and converts requests from applications into read-at-location/write-at-location commands to device drivers are called "filing systems" (also known as "file systems" or "FS's"). Such code is often quite significant; the popular MS-DOS operating system is almost 60% devoted to a particular FS implementation, for example.

In prior art systems, the FS is an integral component of the OS as well as a fixed portion of the hardware initialization and OS start-up process (often called "bootstrap" process or "booting" process). There is some code that is stored in a section of non-volatile memory (sometimes called read-only-memory or ROM) that, as part of the hardware initialization, will issue a command to a specific hardware device to read a specific, but limited in volume and location, set of code from the device into the system's memory. The ROM code will then transfer control to this newly read code and begin execution. This code will issue further commands to the device to read other portions (significantly less limited in quantity and location) of the device into memory. This code comprises the OS as well as the device drivers associated with the OS. Once this code is completely present in the memory of a prior art system, the bootstrap code transfers control to the OS for the remainder of initialization. Since this OS contains an FS, it uses this FS and device drivers to complete its initialization process.

While there may be more than one FS integrated with the prior art OS (linked or bound to the OS code), the relationship between the FS's and OS is fixed at the time the OS is created. Indeed, the OS and FS are combined into a practically indivisible unit during the OS construction. There is a specific association made between a particular FS, a particular device driver (which provides access to the physical device) and the actual medium that is present in the device (called the "volume"). Some physical devices may contain only one volume for their entire lifetime, such as fixed (or hard) disks. Others may contain media that is freely changeable by the operator, such as floppy (or flexible) disks or CDROM disks. This association is fixed at the time the OS is created.

There are some significant and unfortunate implications to prior art systems of the type described above. First, since FS's are indivisibly bound to the OS, it is difficult to upgrade a FS in the field to remedy defects without wholesale replacement of the OS. Second, the construction and binding of the FS to the OS require significant knowledge of the structure and services of the OS. This presents a significant barrier to the innovation of faster and more powerful data storage organizations, since the internal structure and services of OS's are often considered proprietary by their authors and innovation by parties other than the OS authors is thus restricted. This means that the number of FS's available on a particular OS may necessarily be limited. Third, with innovation providing new physical devices with increased capacity and functionality, the inability to add filing systems independent of the OS authors reduces the potential market for new devices. Fourth, since such hardware is not directly accessible through common OS kernel services, software must be provided that is peculiar to the hardware and is not, in general, amenable to access by preexisting applications. Finally, since there exist devices that support removable media, the interchange of such information requires coordination between OS authors in that they must construct FS's that understand the same data organization.

SUMMARY OF THE INVENTION

Briefly described, the present invention discloses a system and method for loading an operating system through use of a file system. A file system that has at least a minimal set of data access and search capabilities is provided for transferring operating system files into computer memory. The minimal set of data access capabilities generally includes file open, file read and file close. A bootstrap program loads the file system stored at a predefined location in storage medium, such as a disk drive, into memory. The file system has an association of the operating system files to locations in the storage medium that contains the files. Once loaded into memory, the file system locates the operating system files in secondary storage by using the association and loads the files into memory. Once the operating system files are loaded, the operating system can use the same file system that was loaded earlier or load one or more additional file systems in the computer memory for its use. The additional file systems can be used by the operating system instead of or in conjunction with the initially loaded file system to complete the initialization process.

OBJECTS OF THE INVENTION

It is an object of the present invention to provide a structure whereby operating systems may be constructed so as to separate the knowledge and control (code and data) that comprise a filing system from the knowledge and control (code and data) that comprise the remainder of the operating system (referred to as the "kernel").

It is another object of the present invention that such separation greatly limit the knowledge that the kernel must have of the filing system and the knowledge that the filing system must have of the kernel.

It is another object of the present invention to provide an organization for operating system kernels which allows multiple file systems separately organized to be available for kernel use and which implement alternate data organizations.

It is another object of the present invention to provide a way for file systems to be bound to the kernel dynamically rather that at the time the operating system is built.

It is another object of the present invention to provide that such dynamic binding may be controlled by the user.

It is another object of the present invention to provide a kernel organization which allows bootstrapping from media with different data organizations.

It is another object of the present invention that provides a kernel organization which allows initialization and construction of different data organizations on various media types.

It is another object of the present invention that such different data organizations are not required to be known to the authors of the OS when the OS is configured.

It is another object of the present invention that specific characteristics and capabilities of newly developed mass storage devices are not required to be known to the authors of the OS when the OS is constructed.

It is another object of the present invention that each media volume is uniquely identified and associated with the file system which understands and is thus responsible for maintaining its data organization and with the associated device that can perform input and output to that volume without user intervention.

It is another object of the present invention wherein input and output requests from applications are issued to the file system responsible for carrying them out on a particular medium.

It is another object of the present invention wherein input and output requests from file systems are issued to the correct device driver.

It is another object of the present invention to provide preferred methods designed for use with the OS/2 operating system.

BRIEF DESCRIPTION OF THE DRAWINGS

These and other objects may be fully appreciated through the detailed description of the invention below and the accompanying drawings in which:

FIG. 7 is a diagram detailing the data structure layout for the File System Control Block (FSC) of such embodiment.

DETAILED DESCRIPTION OF THE INVENTION

Figure 1:
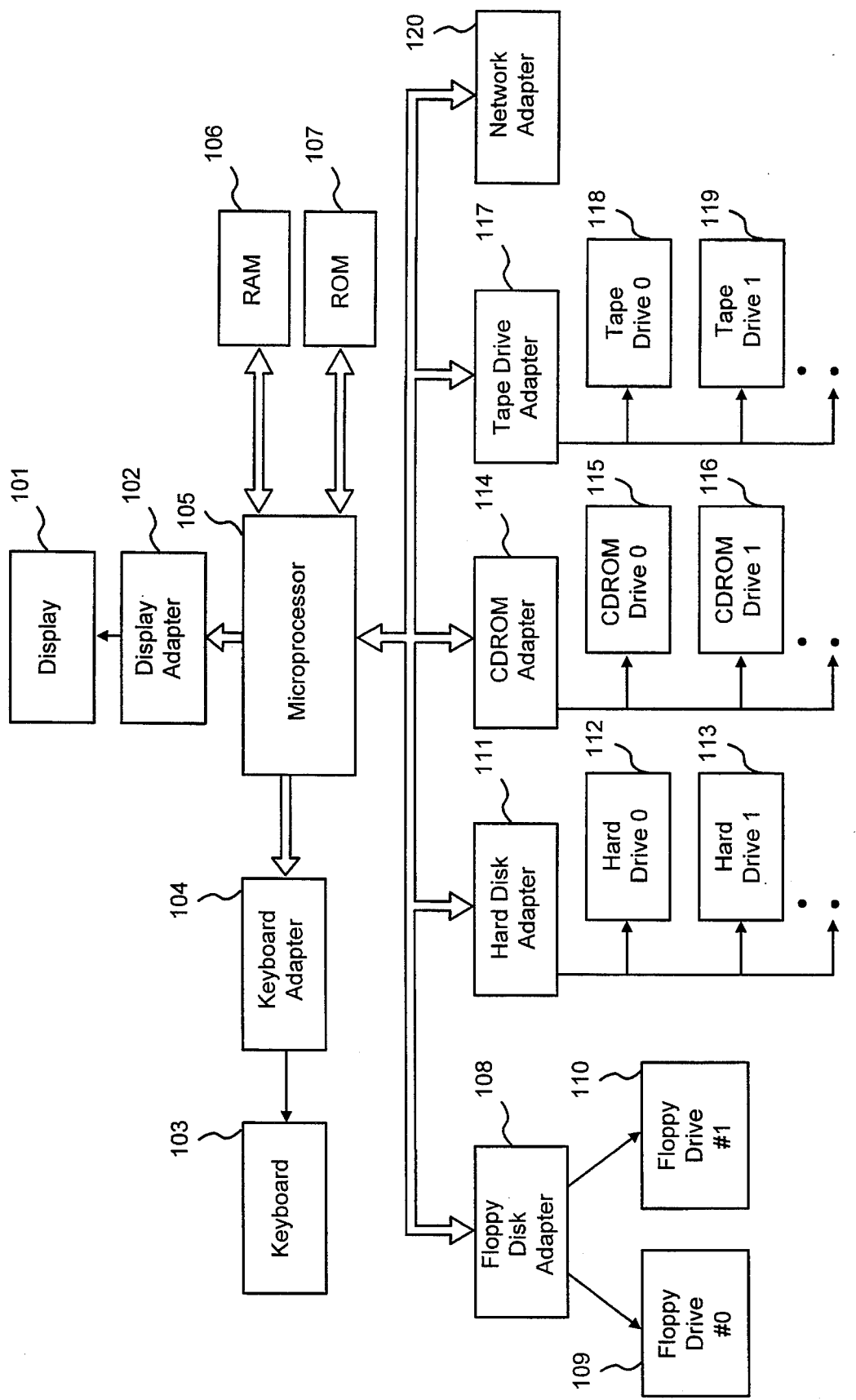
FIG. 1 is a block diagram of a computer system constructed in accordance with the principles of the present invention.

FIG. 1 shows a computer system as constructed in accordance with the preferred embodiment. Such a system has a core and several peripherals connected via a communications bus. The major components of the core are a microprocessor (often called the CPU) 105, random access memory (RAM) 106, and read-only memory (ROM) 107. The peripherals consist of devices that allow information to be input to the system from users (keyboard 103), output to users (display 102), and stored and retrieved (mass storage devices, such as floppy disks 109/110, hard disks 112/113, CDROM 115/116, tape devices 118/119, and networks). Such peripherals often require specific adaptor cards to interface to the core's bus component 108/111/114/117/120.

The construction of such computers typically requires that the core, along with a limited selection of peripherals and adaptors, be purchased from a single manufacturer. After-the-fact acquisitions of peripherals and their associated adaptors often occurs when new peripheral types are developed (e.g., CDROM) as well as when lesser-cost peripherals are made available by other manufacturers and when increased capacity peripherals are made available.

Figure 2:
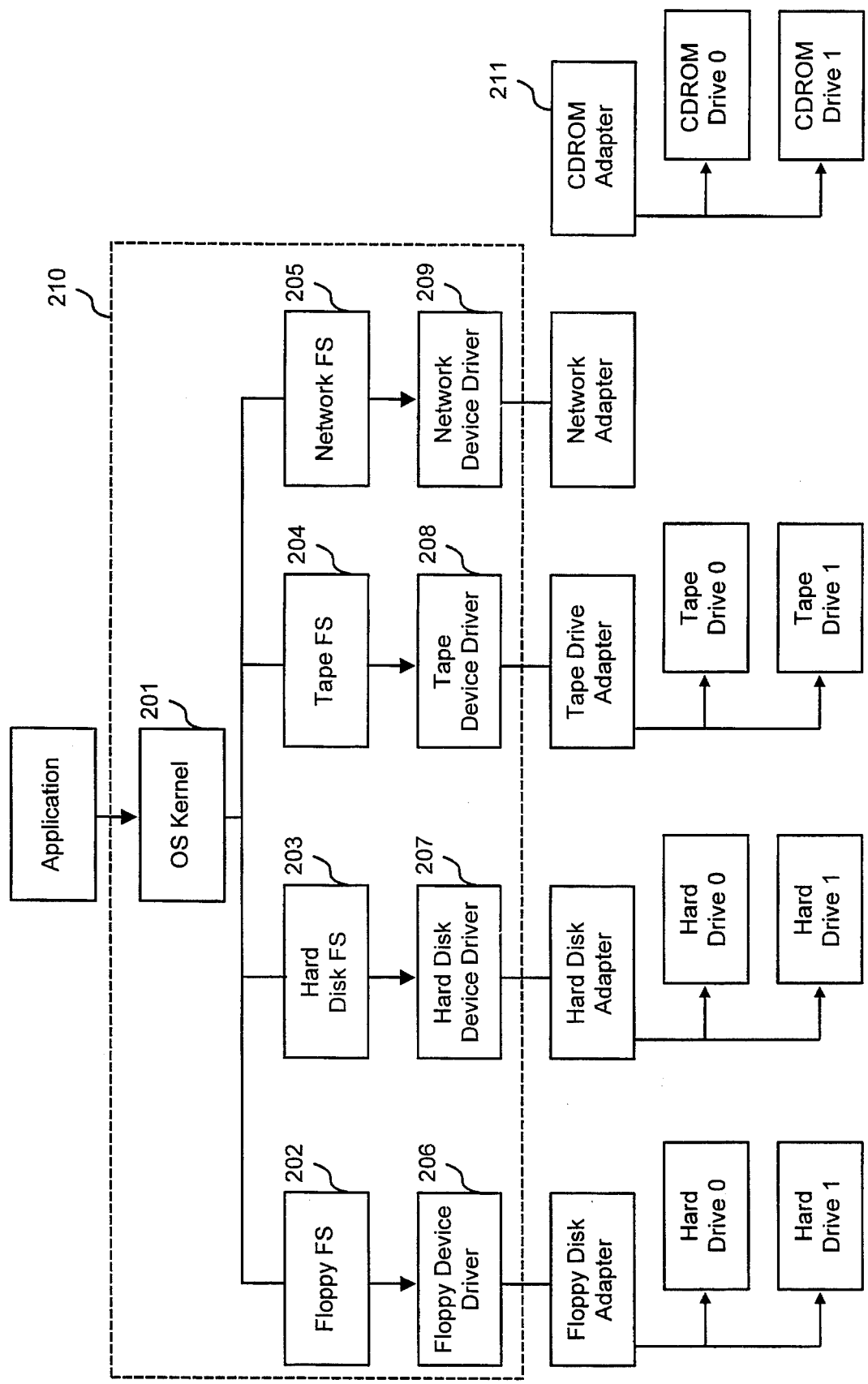
FIG. 2 is a block diagram of a computer operating system constructed in accordance with prior art.

FIG. 2 presents an overview of an operating system in prior art. The kernel 201 is identified as well as the file systems peculiar to each form of device 202– 205. All components 201–209 within the dotted-line-box 210 are typically provided on computer systems as an indivisible unit. Note that with this architecture, if a new type of peripheral becomes available (e.g., CDROM 211), there is no support for such a device (as it was unknown during the construction of the boxed components 210) and there is no recourse except to reacquire the entire operating system 210 at such time as one becomes available with embedded support for the new peripheral type. Thus, the application illustrated in FIG. 2 is not able to access the CDROM device until the new operating system is present.

Figure 3:
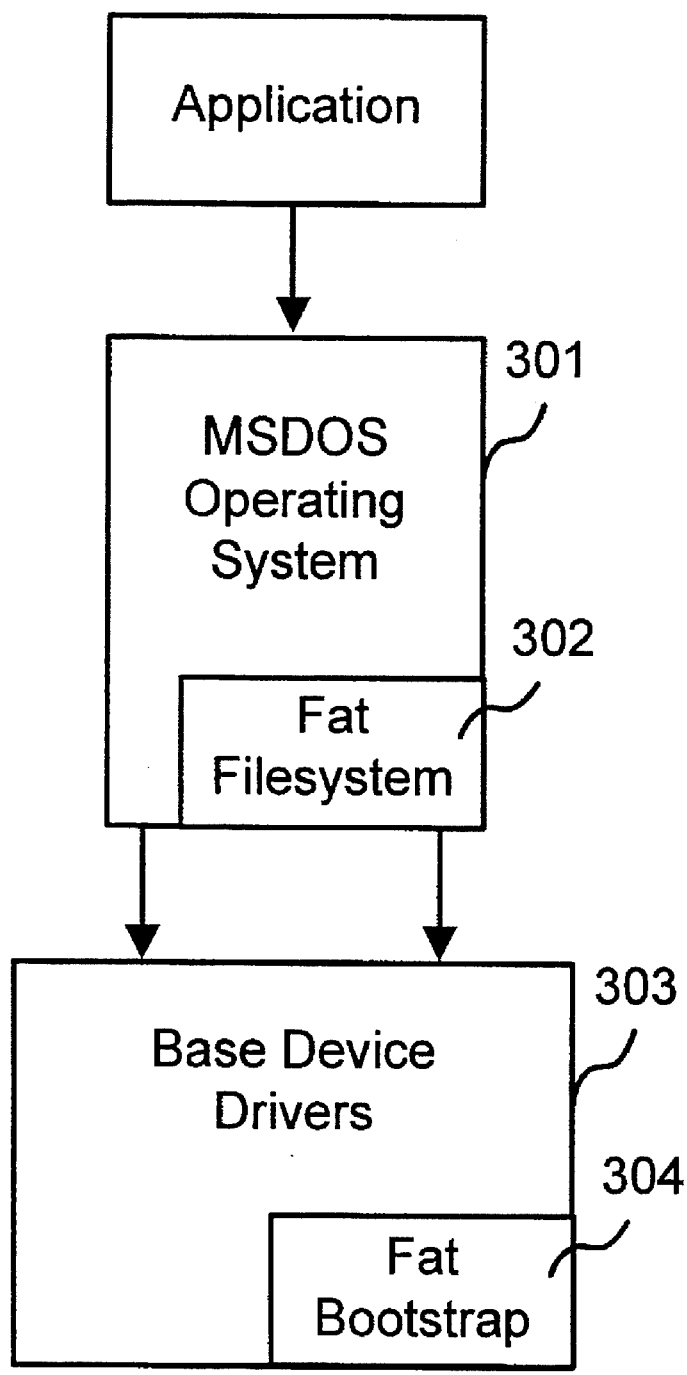
FIG. 3 is a block diagram of a specific example of prior art known as the MS-DOS operating system.

A specific example of this is seen in FIG. 3. The MS-DOS operating system is provided in computer systems as two files, MSDOS.SYS and IO.SYS. MSDOS.SYS 301 contains the kernel as well as the well-known FAT file system 302. IO.SYS 303 contains a set of base (or common) device drivers along with code that performs bootstrapping 304 on the FAT file system. This implies that MS-DOS (without modification) cannot read CDROM media since they have a different data organization called High Sierra. Further, MS-DOS is unable to bootstrap itself from CDROM as IO.SYS 303 cannot understand the High Sierra format.

The FAT file system has knowledge of MS-DOS memory allocation routines and control structures. In order to add High Sierra support to MS-DOS, a programmer would have to have access to the source code for MS-DOS, which is considered proprietary. This makes it exceedingly difficult to provide access to High Sierra.

Figure 4:
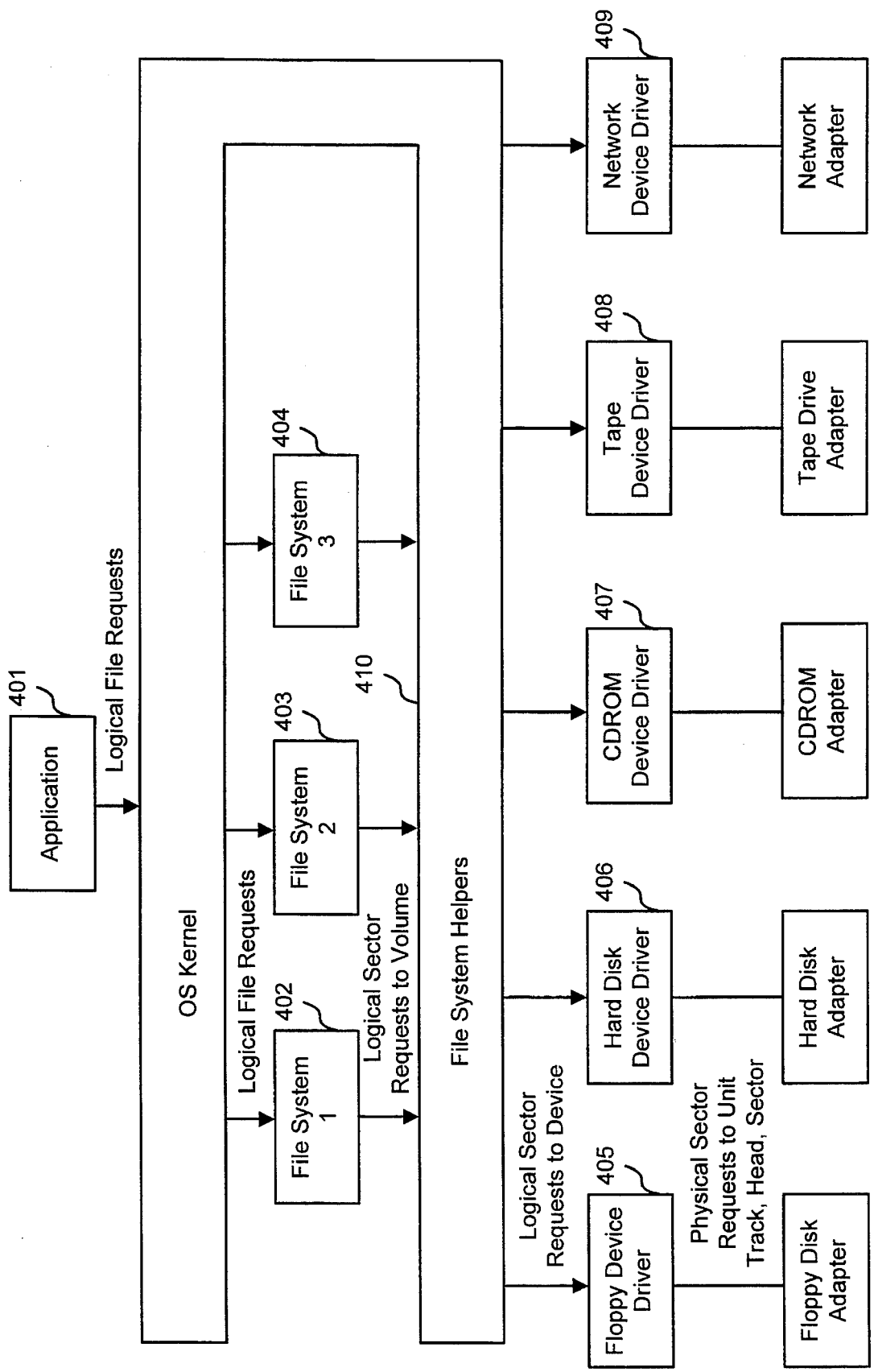
FIG. 4 is a diagram detailing the structure of an operating system constructed in accordance with the present Installable File System invention.

FIG. 4 presents a block diagram of an operating system constructed in accordance with the present invention. The invention has applications 401 making logical file requests (as in prior art). These requests are either name-based, in which the application passes in a character string specifying the name of the file, or handle-based, in which the application passes back to the operating system a "handle" or token that the operating system is able to associate with an open file or other ongoing operation (e.g., a directory enumeration).

Once the application issues one of these requests to the kernel, the kernel examines the input parameters and based upon them, transfers the request to one of several loaded (or installed) file systems 402–404. This request is still at the logical file level. The file system is now free to process the request according to its specific design and data organization (e.g., directories may be maintained as BTrees or as simple lists; free storage represented as linked lists or bit maps).

As the file system processes the request, it may find itself in need of several different services based upon its own specific requirements. Rather than having a specific and detailed knowledge of kernel routines and data structures, some well-defined and general purpose routines are provided to these file systems. These routines are called File System Helpers 410. By providing this small set of well-defined routines, a file system is relieved of the need of detailed kernel knowledge.

For example, when the file system wishes to request data to be read from a volume, it does not need to know how to request such service of either the hardware or of a device driver, but issues a helper call (FSH_DOVOLIO) indicating which volume is to be accessed, or is to be read from, the logical location of the data on the volume, the amount of data, and the location in memory where the data is to be put. This logical location is not in the form of a specific hardware location (e.g., cylinder/head/sector) but in the form of an element of a single-dimensional array of sectors. The helper (part of the kernel) will use the volume identifier and route the request to the correct physical device driver 405–409 and in conjunction with the driver assure that the operation is performed on the correct volume.

This separation of the file systems from the kernel is important to most phases of operating system processing in this invention. By separating the file system, it is possible to add a file system to a computer system without reaquiring, modifying, rebuilding, or reinstalling the operating system; and it is possible to upgrade a file system on a computer system without reaquiring the operating system.

Figure 5:
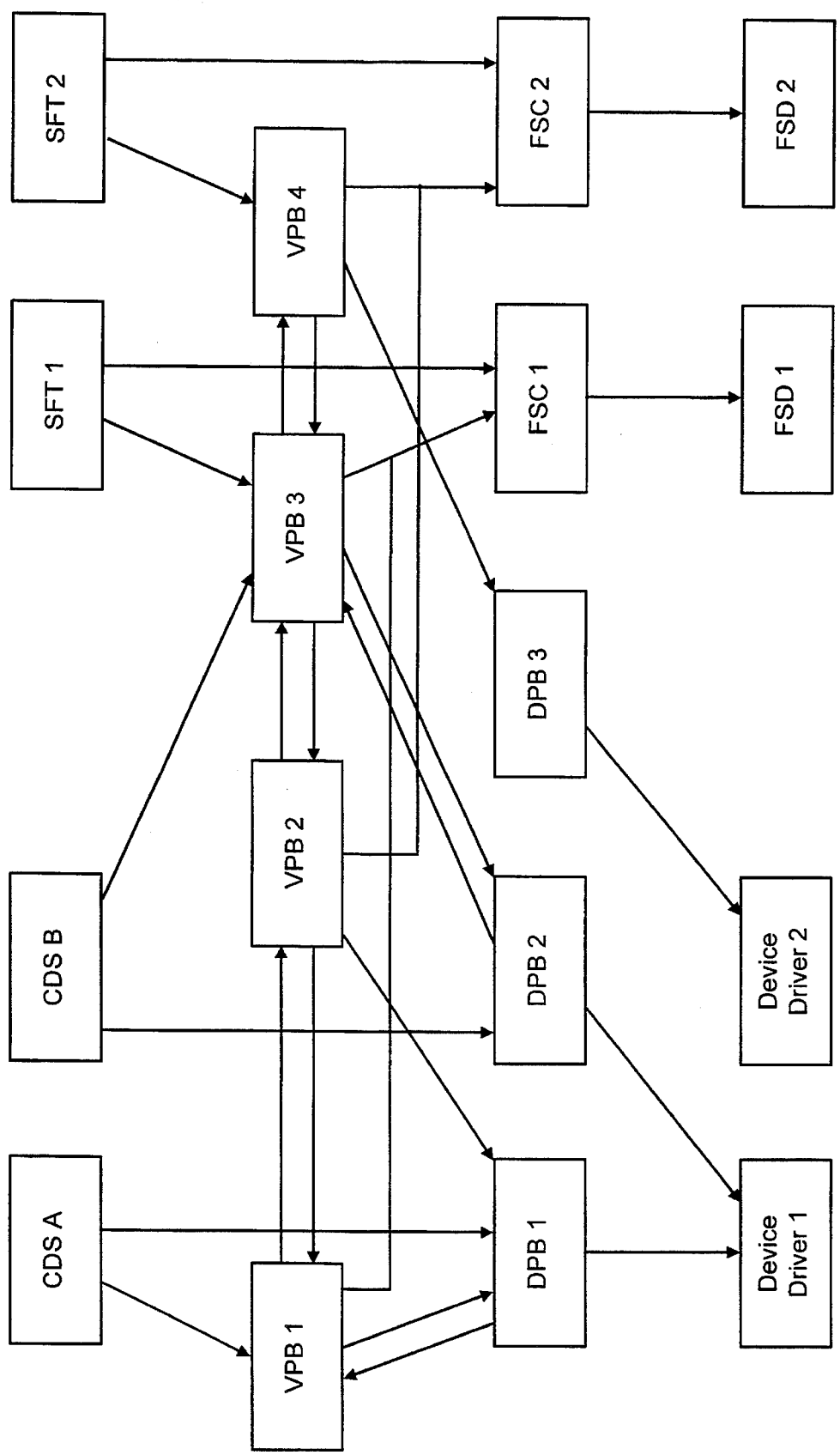
FIG. 5 is a diagram illustrating the linkages between the major data structures of the preferred embodiment of the present invention.

The preferred implementation of the invention is illustrated herein based upon a collection of data structures organized by the system into lists. Each list consists of a particular type of data structure and is used for enumeration of the data structures. FIG. 5 indicates these data structures and identifies the major linkages.

Figure 6:
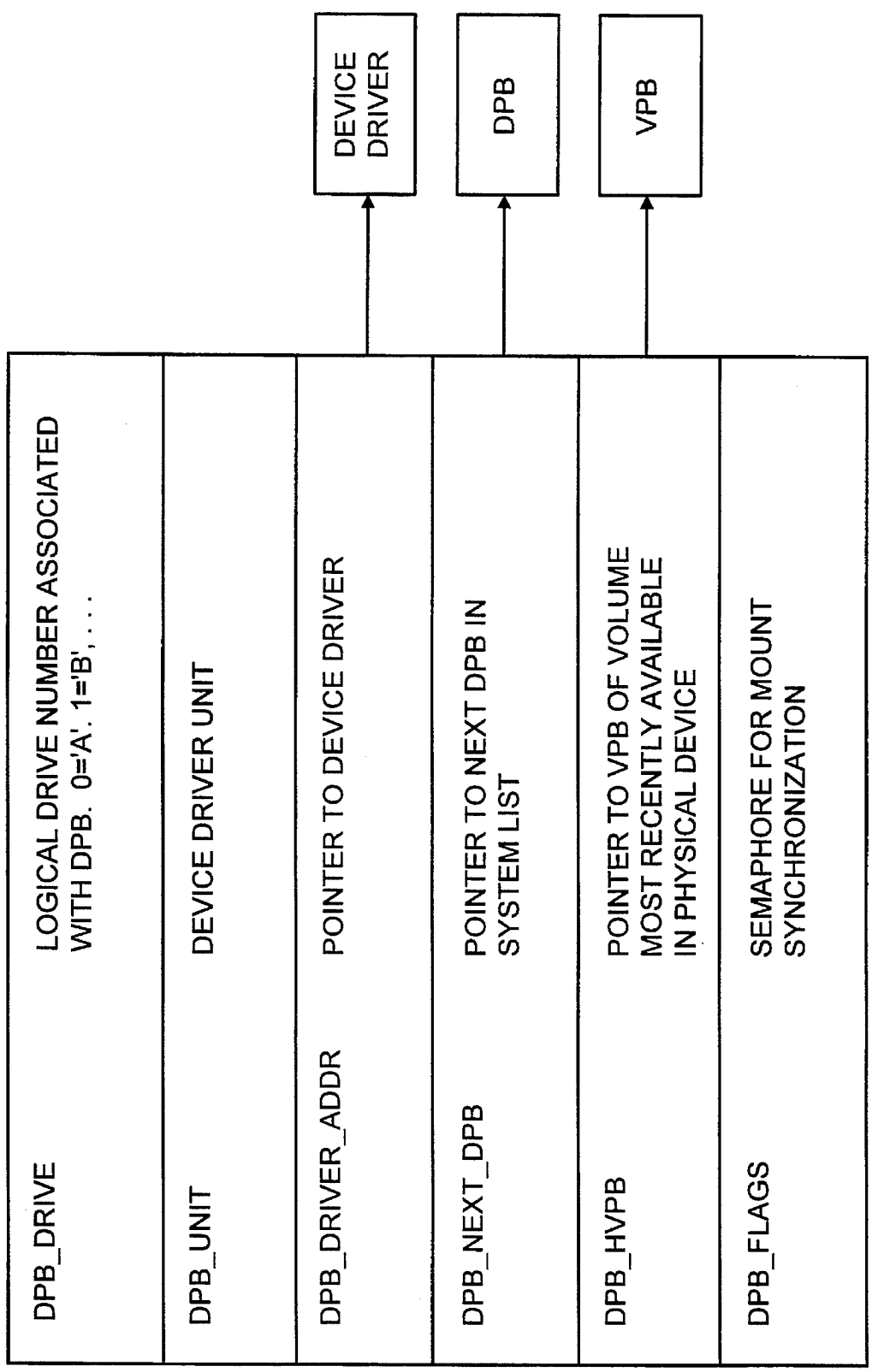
FIG. 6 is a diagram detailing the data structure layout for the Drive Parameter Block (DPB) of such embodiment.

The first structure used by the invention is the drive parameter block (DPB) seen in FIG. 6. Since a particular type of hardware device may support access to more than one medium, device drivers may present to the kernel a series of units. The kernel may (through the use of CDS's below) expose these units to the applications as independent volumes. Each DPB represents one unit. The DPB includes the following data fields:

DPB_DRIVE: The logical drive number associated with this DPB. In the path-name conversion calls discussed below, this is used to identify a particular device and unit given a name from an application.

DPB_UNIT: The unit number identifying a unique unit within the relevant physical device.

DPB_DRIVER_ADDR: The address of a structure containing the function request subroutine in a device driver.

DPB_NEXT_DPB: The address of the next DPB in the system list.

DPB_HVPB: The pointer to the VPB (see below) of the volume most recently seen in the device.

DPB_FLAGS: A semaphore for synchronization.

The second structure used is the File System Control block (FSC) seen in FIG. 7. There is one FSC for each successfully initialized file system. Successfully initialized file systems may be called upon at any time by the kernel to perform application-level operations on a particular medium. The FSC includes a table of addresses of functions that support application level storage access requests as well as functions that support volume recognition and information tracking. These functions are:

FS_ATTACH—allows creation of a CDS (see below) for a network volume.

FS_CHDIR—verifies that a directory path exists and allows for file systems to track information maintained in the CDS (see below). This is in support of the application DosChDir call as well as support for all application calls that take path names.

FS_CHGFILEPTR—changes the logical read-write position within a file. This is in support of the application DosChgFilePtr call.

FS_CLOSE—terminates access to a file. This is in support of the application DosClose call.

FS_COPY—copies files or subhierarchy of the file system within a medium. This is in support of the application DosCopy call.

FS_DELETE—deletes a file. This is in support of the application DosDelete call.

FS_EXIT—bookkeeping call used to help release resources when an application terminates.

FS_FILEATTRIBUTE—querying and setting an attribute governing the accessibility of a file or directory. This is in support of the application DosQFileMode and DosSetFileMode calls.

FS_FILEINFO—querying and setting detailed information about an open file. This is in support of the application DosQFileInfo and DosSetFileInfo calls.

FS_FILEIO—provides a mechanism where multiple reads, writes, locks, and unlocks can be performed with a minimum of transaction overhead. This is in support of the application DosFileIO call.

FS_FINDCLOSE—terminates an enumeration sequence. This is in support of the application DosFindClose call.

FS_FINDFIRST—begins an enumeration of files and directories whose name matches a specified pattern. This enumeration can return detailed information about the matched files and directories. This is in support of the application DosFindFirst call.

FS_FINDNEXT—continues an enumeration, returning further matching files and directories and, optionally, detailed information about such. This is in support of the application DosFindNext call.

FS_FINDNOTIFYCLOSE—terminates a change-notification sequence. This is in support of the application DosFindNotifyClose call.

FS_FINDNOTIFYFIRST—begins a change-notification sequence, allowing an application to be informed of changes in a shared directory. This is in support of the application DosFindNotifyFirst call.

FS_FINDNOTIFYNEXT—continues a change-notification sequence by acknowledging the previous notification and awaiting the next notification. This is in support of the application DosFindNotifyNext call.

FS_FSINFO—queries and sets information about a file system or volume managed by a file system. This is in support of the application DosQFsInfo and DosSetFsInfo calls.

FS_INIT—requests initialization of the file system. This is in support of operating system initialization.

FS_IOCTL—device-driver-specific command and control. This is in support of the application DosDevIoctl call.

FS_MKDIR—creation of a directory. This is in support of the application DosMkDir call.

FS_MOUNT—request to mount/recognize a volume, a notification that the volume was removed but is still being accessed by an application, or a notification that the volume is no longer being accessed by an application.

FS_MOVE—request to move (or rename) a file or directory. This is in support of the application DosMove call.

FS_NEWSIZE—grows or shrinks an open file to a specified size. This is in support of the application DosNewSize call.

FS_NMPIPE—support of all named pipe API's. This is in support of the application DosCallNmPipe, DosConnectNmPipe, DosDisconnectNmPipe, DosMakeNmPipe, DosPeekNmPipe, DosQNmPHandState, DosQNmPipeInfo, DosQNmPipeSemState, DosSetNmPHandState, DosSetNmPipeSem, DosTransactNmPipe, and DosWaitNmPipe calls.

FS_OPENCREATE—opens an existing file or creates a new file and opens it. This is in support of the application DosOpen call.

FS_PATHINFO—queries or sets information on a file or directory. This is in support of the application DosQPathInfo and DosSetPathInfo calls.

FS_PROCESSNAME—examines and modifies a path name according to file system rules. This is in support of all application calls that accept path names.

FS_READ—transfers data from a physical device to application memory. This is in support of the application DosRead call.

FS_RMDIR—removes a directory. This is in support of the application DosRmDir call.

FS_SETSWAP—notifies the file system that a particular open file is the system swapping/paging file in order to provide specialized services.

FS_WRITE—transfers data from application memory to a physical device. This is in support of the DosWrite call.

FS_COMMIT—assures that system integrity information relating to an open file is updated on the physical device. This is in support of the application DosBufReset and DosClose calls.

FS_FSCTL—command and control of the file system. This is in support of the application DosFsCtl call.

FS_FLUSHBUF—assures that data from an application's open file is updated on the physical device. This is in support of the application DosBufReset call.

FS_SHUTDOWN—notifies the file system that the OS is being shut down so that it may perform last-minute bookkeeping. This is in support of the application DosShutdown call.

Additionally, there is a data field FS_NAME that contains a pointer to a textual string containing the name supplied by the file system. This name is used to uniquely identify a file system.

Figure 8:
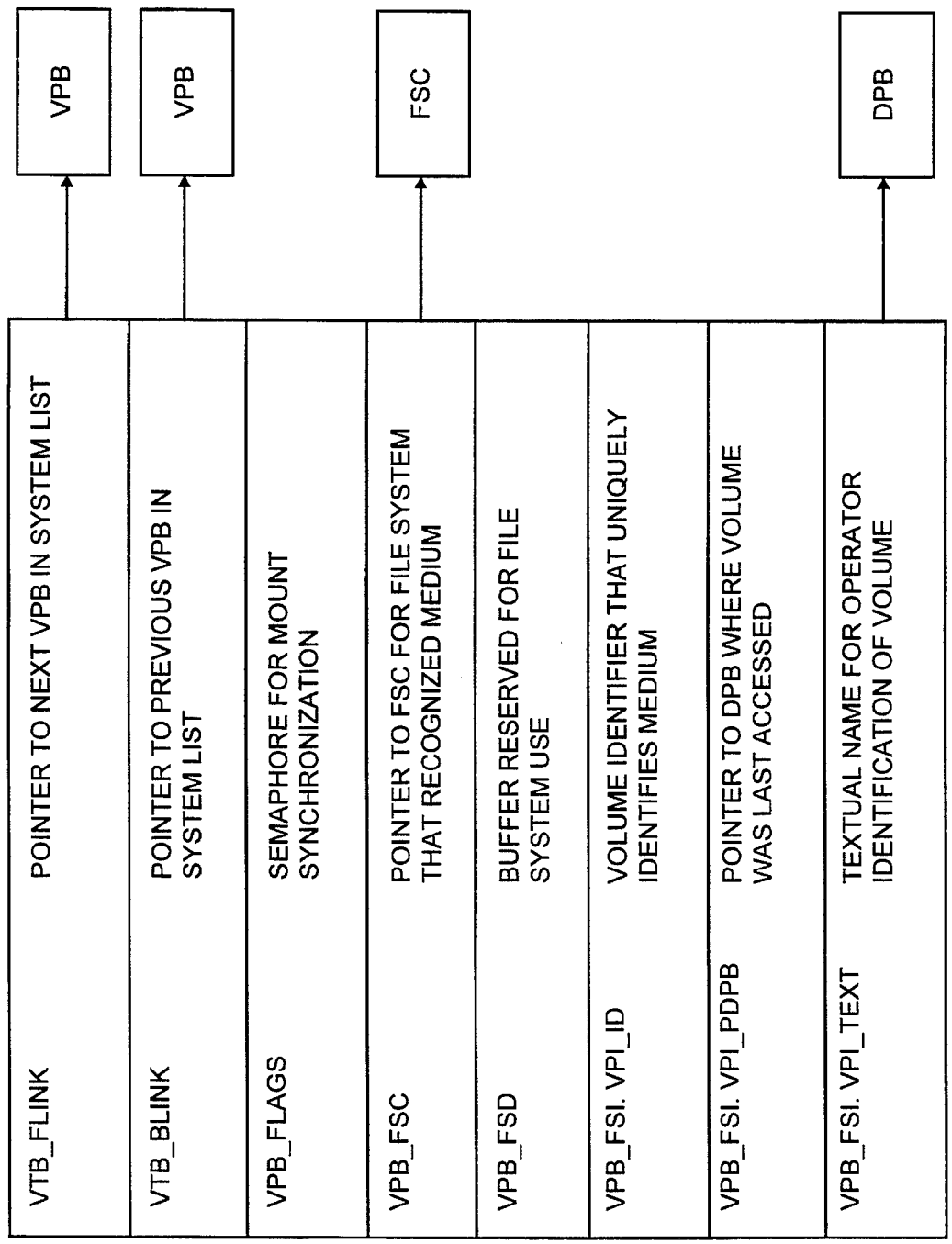
FIG. 8 is a diagram detailing the data structure layout for the Volume Parameter Block (VPB) of such embodiment.

The third structure represents a volume that has been accessed by the kernel and that has been recognized by a file system, and is called a Volume Parameter Block (VPB) seen in FIG. 8. Any reference within the kernel to a volume is done through a VPB. Any I/O operation issued by a file system is done by providing a VPB. The VPB includes the following data fields:

VPB_FLINK, VPB_BLINK: the addresses of two other VPBs that are used to construct a doubly-linked list of VPBs VPB_FLAGS: a semaphore used for synchronization during media identification VPB_FSC: a pointer to the FSC for the file system that has mounted the associated volume.

VPB_FSD: a data area whose contents are neither examined nor modified by the kernel but are provided for the file system to store volume-specific information VPB_FSI.VPI_ID: A 32-bit volume identifier.

VPB_FSI.VPI_PDPB: a pointer to the DPB where the volume was recognized.

VPB_FSI.VPI_TEXT: a 12-character buffer containing the text of a label for the volume. This label is set by application action and is used by the operator as a name by which he can recognize and identify a volume.

Figure 9:
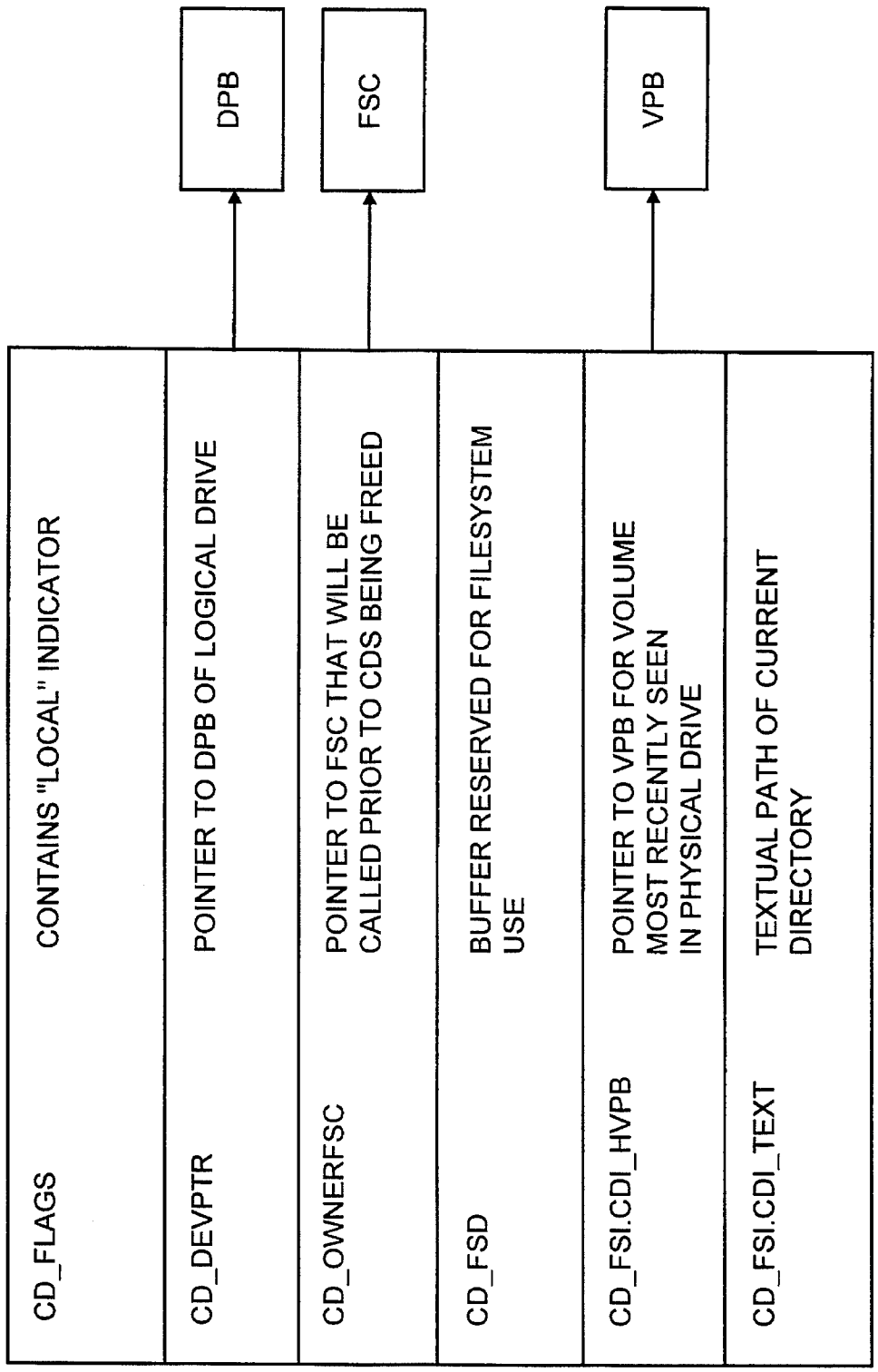
FIG. 9 is a diagram detailing the data structure layout for the Current Directory Structure (CDS) for local media of such embodiment.
Figure 10:
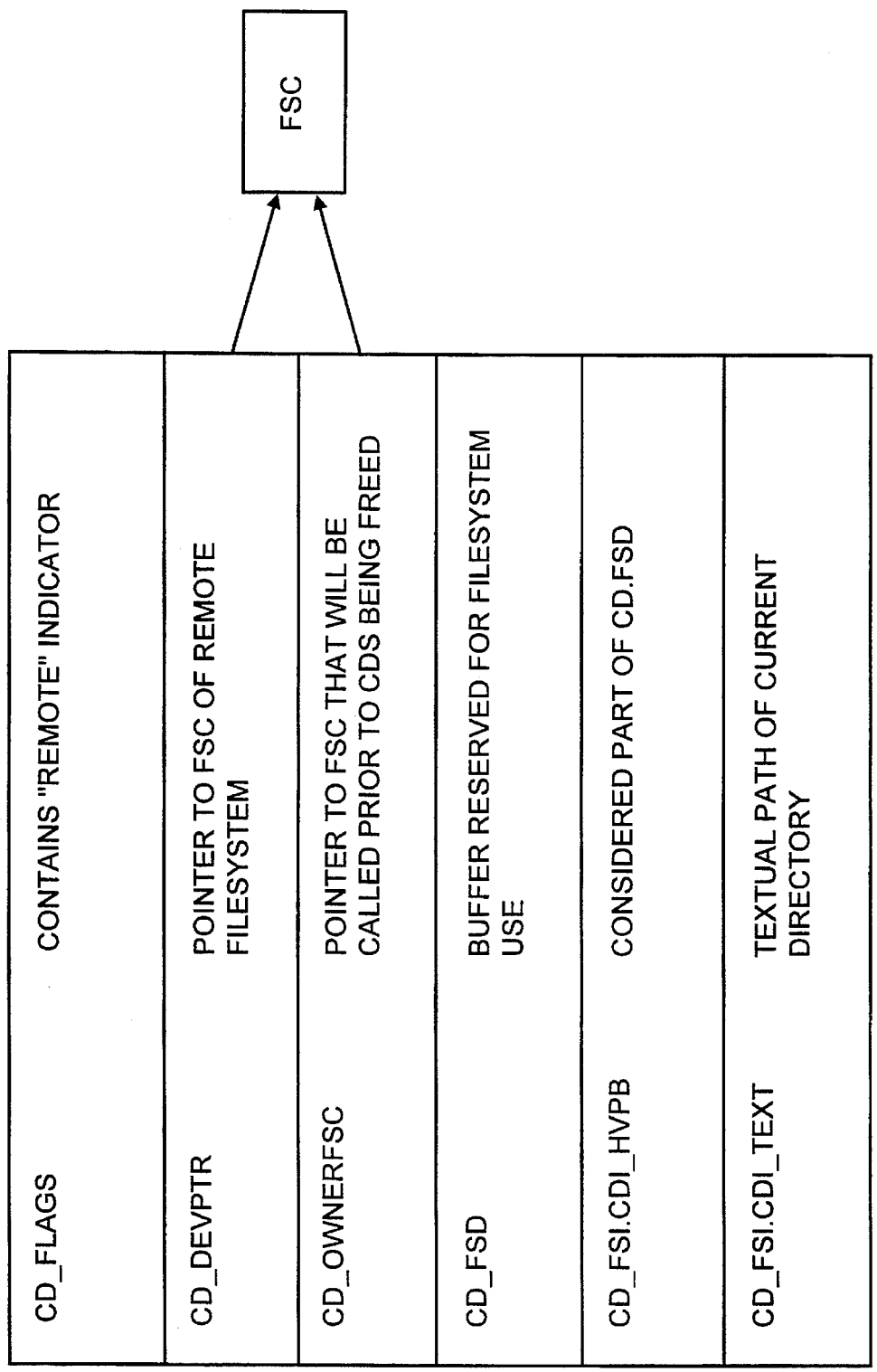
FIG. 10 is a diagram detailing the data structure layout for the Current Directory Structure (CDS) for remote media of such embodiment.

The fourth structure is the Current Directory Structure (CDS) seen in FIGS. 9 and 10. There is a CDS for each logical volume available to the user. The application refers to a logical volume by including a letter in the range A–Z. The CDS includes the following data fields:

CD_FLAGS: contains a single bit indicating whether the CDS is statically attached to a remote file system or dynamically attached to a local file system.

CD_DEVPTR: pointer to DPB for local physical device (FIG. 9) or pointer to FSC for network file system (FIG. 10).

CD_OWNERFSC: pointer to FSC for file system that is responsible for creation of the CDS. This is used to handle the deallocation of a CDS when it is no longer in use. The file system associated with the FSC is given the opportunity to release any resources associated with this CDS before it is freed.

CD_FSD: a data area whose contents are neither examined nor modified by the kernel but are provided for the file system to store current-directory-directory-specific information CD_FSI.CDI_HVPB: for a local CDS, a pointer to the VPB for the volume that the CDS that was most recently recognized in the physical device. For a remote CDS, this is considered part of CD_FSD.

CD_FSI.CDI_TEXT: a 260-character buffer where the text of the current directory is stored. This information is used as the context to form the full path name of a file or directory given a partial path name by an application.

Figure 11:
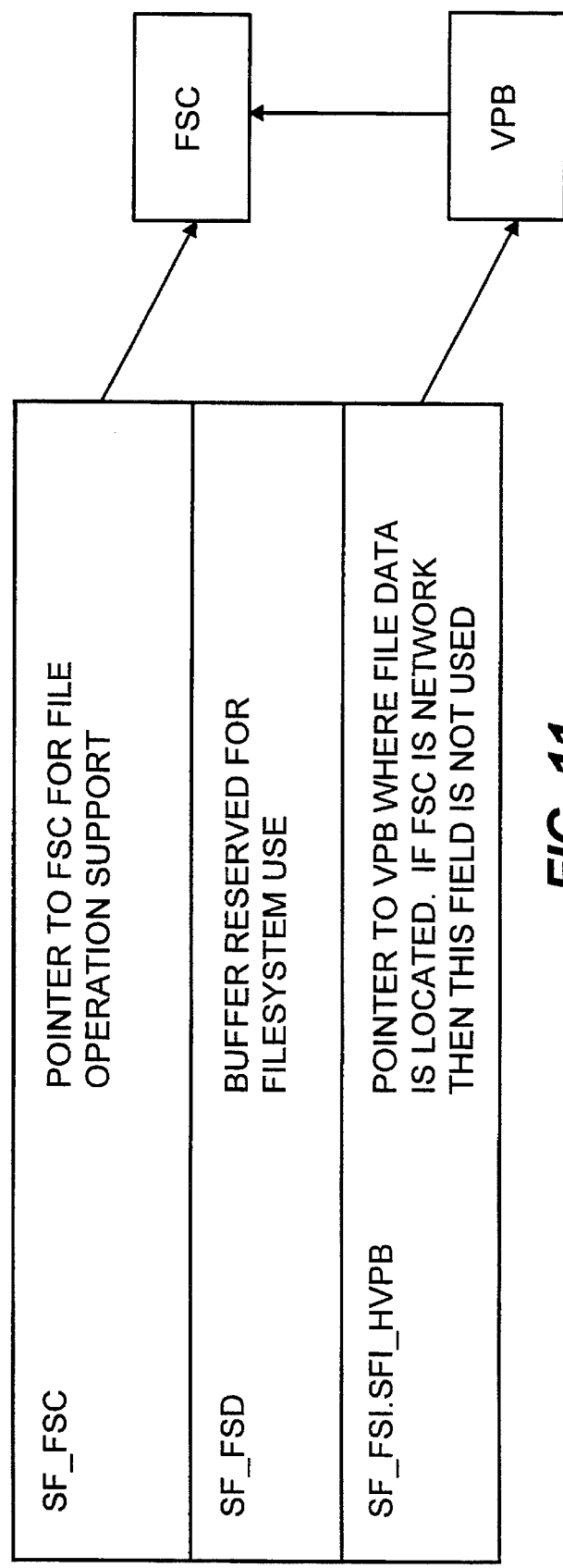
FIG. 11 is a diagram detailing the data structure layout for the System File Table Entry Structure (SFT) of such embodiment.

The fifth structure is the System File Table entry (SFT) seen in FIG. 11. This is an example of a structure that is accessible to the application only via a handle. Each time a file is opened, an SFT is allocated and initialized. The SFT contains all information necessary to performing reads and writes to a file. The SFT includes the following data fields:

SF_FSC: a pointer to the FSC that provides the support for file I/O to this file.

SF_FSD: a data area whose contents are neither examined nor modified by the kernel but are provided for the file system to store open-file-specific information.

SF_FSI.SFI_HVPB: a pointer to the volume where the file data is located. This field is not used for a file accessed via a network (as opposed to a local physical device).

In order to reduce the knowledge of kernel data structures and services, a limited set of helper routines is provided that enable file systems to adequately and efficiently perform their task. These services break down into several categories, of which the following exemplify the separation between details of kernel implementation and knowledge of the file system in regards to said implementation.

Memory management services that eliminate the need for the file system to understand how the OS manages memory:

FSH_FORCENOSWAP—mark a specific piece of memory as not being eligible for overcommit and that must be resident in main memory in all circumstances. In virtual memory operating systems (like OS/2) the contents of some portions may be written to mass storage and later read back when needed. However, all code and data required to perform this read-back must never be written out. This service will be used by the file system when it is issued the FS_SETSWAP call.

FSH_SEGALLOC—allocate a block of memory. File systems may need to allocate further memory as demands are placed on them by applications.

FSH_SEGFREE—release a block of memory. In order to be space efficient, memory that is no longer required by the file system should be released to the kernel via this call.

FSH_SEGREALLOC—grow or shrink a block of memory. Dynamic growing/shrinking reduces the burden on file systems of tracking a set of fixed-size memory blocks.

Synchronization services that allow concurrent access by other applications' requests to data shared inside the file system:

FSH_SEMCLEAR—release a semaphore.

FSH_SEMREQUEST—request a semaphore; if the semaphore is not available, the requestor will wait until it is available or until a specified timeout occurs. When it becomes available, the first waiter is given ownership and released from its wait.

FSH_SEMSET—place a semaphore into an owned state.

FSH_SEMWAIT—wait until a semaphore is in an unowned state.

Input/output services allow file systems to request information transfers between a volume and memory as well as command and control device drivers:

FSH_DOVOLIO—perform a read or write operation between a volume, as identified by a pointer to a VPB, and main memory.

FSH_DOVOLIO2—command and/or control the operation of a physical device as identified by a pointer to a DPB.

Textual string processing services that provide a uniform set of capabilities such that applications can rely on uniform structure in path names as well as uniform name-matching semantics:

FSH_CANONICALIZE—given a path name, transform it into a canonical form according to the kernel's rules for name-formation. This allows the kernel's rules to be defined/refined without changing the file system.

FSH_FINDCHAR—locate the next occurrence of one of a set of characters in a string. This allows the kernel to efficiently perform this search without having the file system concerned with the details of foreign language support. This support is maintained completely within the kernel.

FSH_WILDMATCH—test to see if one path string matches, using the kernel-defined rules for string pattern matching, a specified pattern. This is used for file and directory enumeration.

Volume mounting (recognition) services:

FSH_FINDDUPHVPB—during the mounting process, a new VPB is generated for the current medium in a physical device. It may be the case, however, that this medium was just reinserted. Thus, the OS will already have created a VPB that is referenced by other system data structures (as above). To adequately handle this situation, this service is provided to assist the file system in finding the putative VPB for the medium. See the description of volume mounting below.

The initialization (or bootstrapping or booting) process typically occurs when power is first applied to a computer system. In the preferred embodiment of the present invention described herein, the portions of this process (code and data) that are specific to a particular data organization are separated from the operating system kernel. The process of bootstrapping from local media is seen on FIG. 12.

When power is first applied to the system 1201, the CPU 105 (see FIG. 1) is placed into an initialized state where it retrieves its instructions from ROM. The ROM contains information that is not lost when power is absent from the computer system. These instructions initialize the core system 1202 as well as the distinguished device adaptor and device (called the "boot device") in which the operating system is stored.

Once initialized, the code resident in the ROM will issue a command to the boot device to read code and data from a distinguished place on the volume in that device 1203. Once read, the ROM then transfers control to this code 1204.

This boot device code then uses ROM services to read the "mini" file system from the media into memory 1205. It is described as a "mini" file system as it needs to support only the file open, file read, and file close application calls. It can, however, be a full file system; during the booting process, only the file open, read, and close operations will be called. Once booting is complete, all other operations will be eligible to be called.

The boot device code will also read OS2LDR from the media into memory and transfers control to it, passing the address of the mini file system in memory 1205. OS2LDR will "fixup" the mini file system code and data to provide it with its own address in memory as well as the address of file system helpers contained in the OS2LDR code 1206. These helpers are the same as the helpers for "full" file systems, with the exception of the input/output helpers. Unlike the full helpers, these are not required to provide reliable volume-based input/output as during the boot phase there is no mechanism for informing the user of incorrect volume problems. The OS2LDR portion that performs the I/O does so by communicating with ROM services.

OS2LDR will then call the mini file system to initialize itself 1206. Upon completion of this initialization, OS2LDR will build an FSC for the mini by extracting a table of addresses from control information in the FSC data 1206.

At this point, OS2LDR will call the FS_OPEN, and FS_READ calls in the mini file system to read the operating system kernel OS2KRNL into memory 1207. Upon completion, OS2LDR transfers control to OS2KRNL, passing to it the address of the FSC for the mini file system 1208.

OS2KRNL will add to its previously empty list of FSC's the FSC of the mini file system and then complete its initialization 1209.

It is important to note that OS2LDR is a portion of the operating system that is acquired from the operating system vendor but it contains no knowledge of the file system data organization. The mini file system may be provided by the operating system vendor but, alternately, it may be provided by a separate party. The mini file system requires no special knowledge of OS2LDR nor OS2KRNL beyond the limited set of file system helpers.

Figure 13:
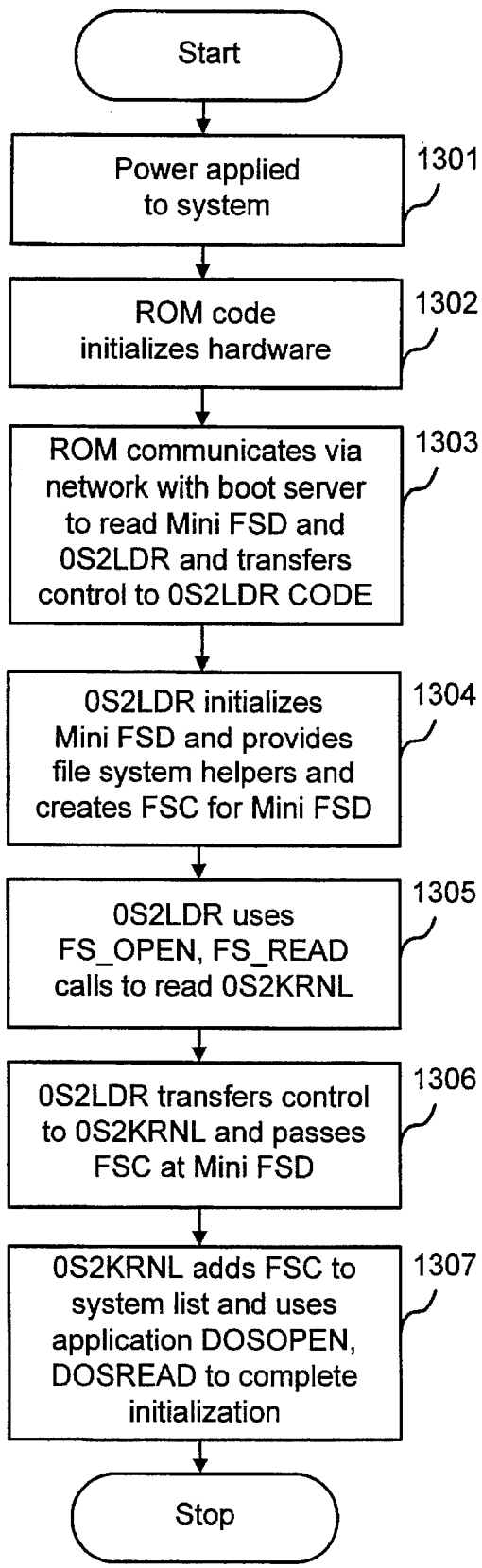
FIG. 13 is a flow diagram detailing the overall operation of system initialization from remote media in accordance with the present invention.

FIG. 13 describes the process of bootstrapping from network media. This case is important as there are many computer system installations where individual computer systems have no mass storage attached to them at all. All file storage must occur through a network, for example.

As before, once power is applied 1301, the CPU is placed into an initialized state and begins executing code located in the ROM. This ROM is specific to bootstrapping from the network and, after initializing the core 1302, initializes the network device and issues commands to the network device to communicate with another computer attached to the same network to transfer a mini file system and OS2LDR from the other computer into memory 1303. Once this transfer has occurred, the ROM will transfer control to OS2LDR code 1303.

Bootstrapping will proceed as before, with OS2LDR "fixing-up" the mini file system, calling the mini file system to initialize, building an FSC for the file system 1304, then calling FS_OPEN and FS_READ to read OS2KRNL 1305, and transfer control to OS2KRNL, passing the FSC of the mini file system 1306.

Since OS2LDR is using ROM services to provide input/output services to the mini file system, there is no knowledge whatsoever of whether the computer system is being bootstrapped from local media or from remote media.

Figure 14A:
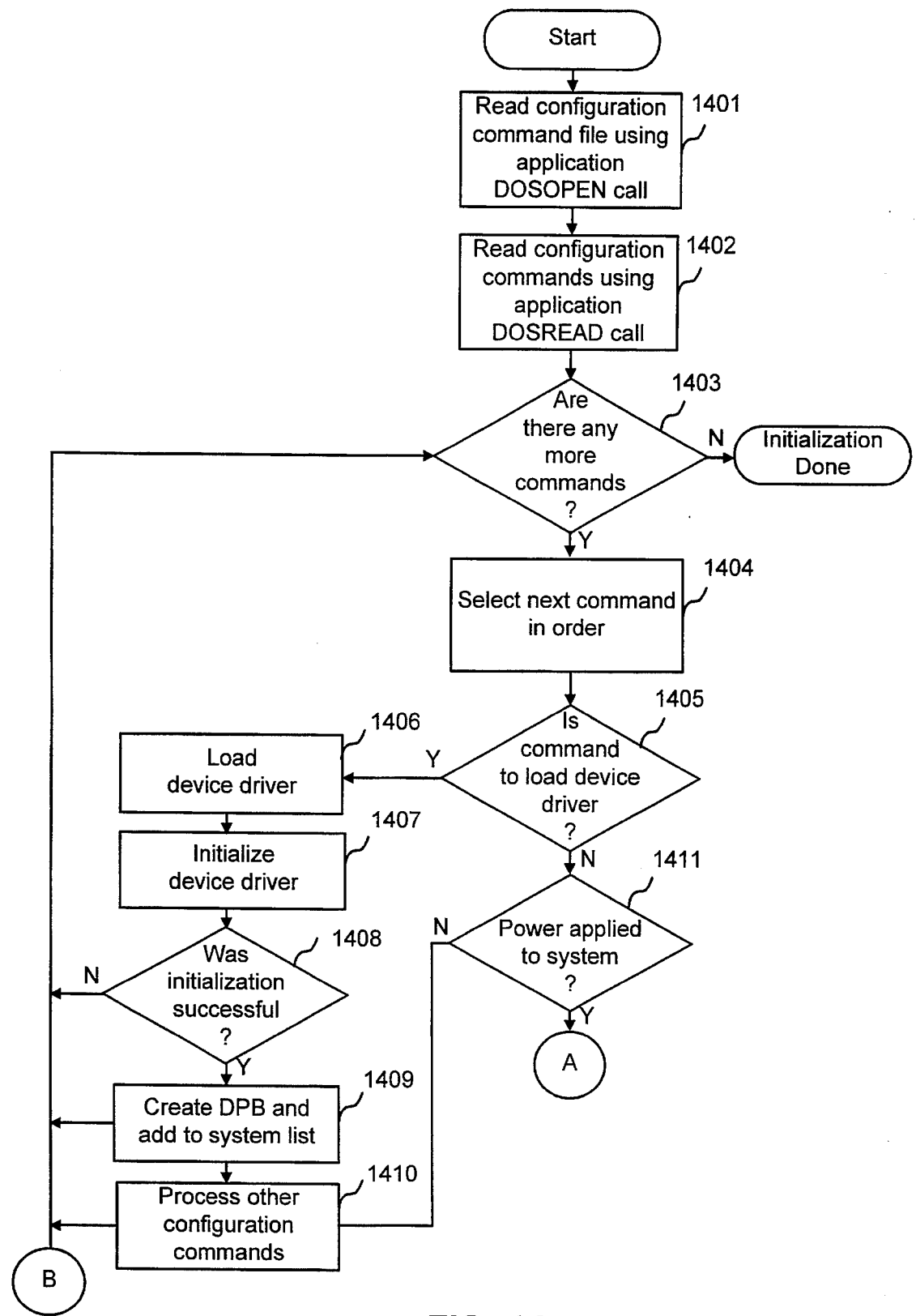
FIGS. 14A and 14B are a flow diagram detailing completion of kernel initialization in accordance with the present invention.
Figure 14B:
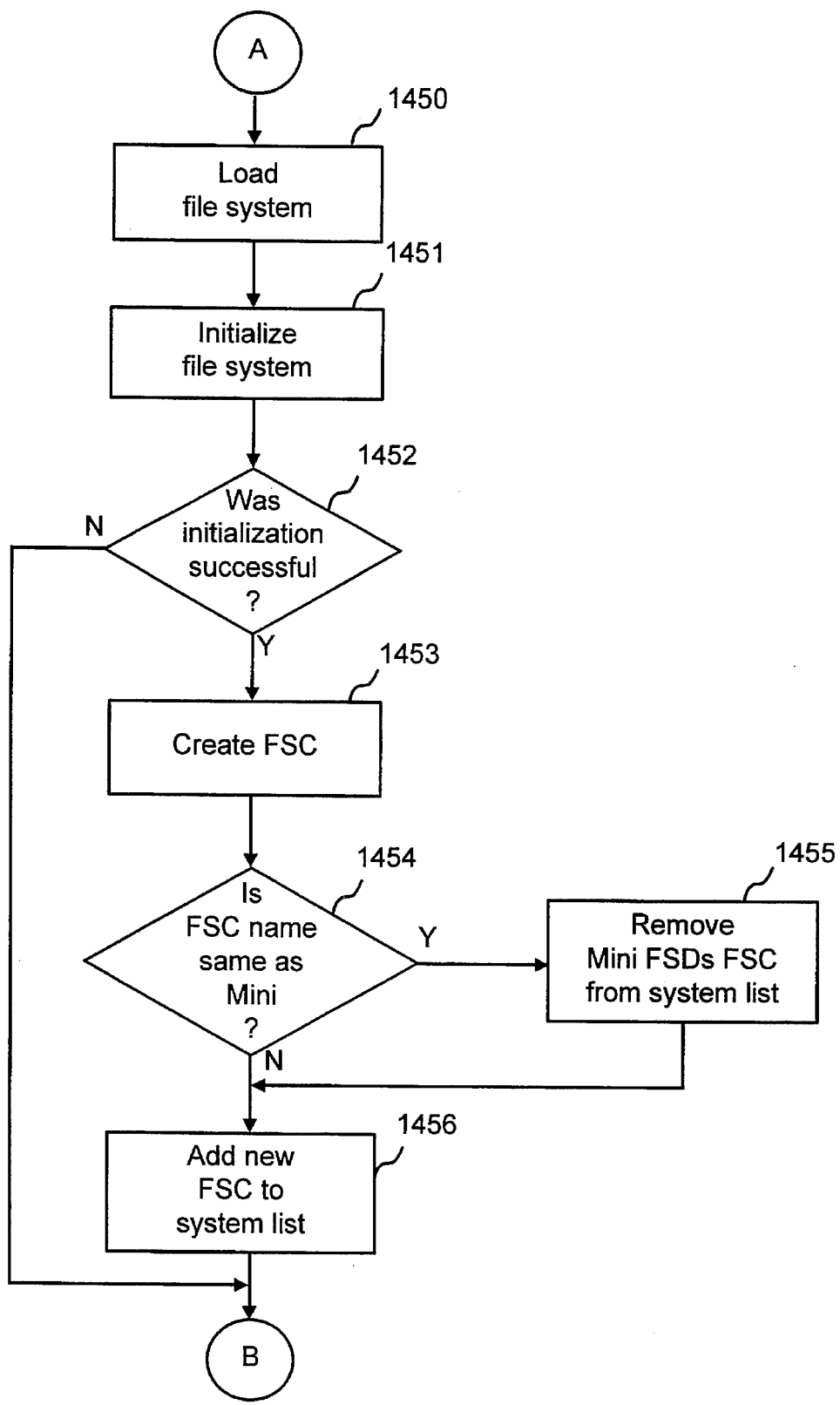

Once OS2KRNL has been read into memory, been given control, and has added the FSC of the mini file system to its list, it must complete its initialization 1307. FIG. 14 is a flow diagram for this process.

OS2KRNL may perform some further operating-system-specific initialization, such as memory manager initialization or scheduler initialization. Once it has completed this, it then issues an application DosOpen call to open the operating system configuration command file 1401. This file consists of a list of commands directing self-customization. Once opened, the contents of this file are read into memory using the application DosRead call 1402.

For each command 1403, 1404, OS2KRNL examines it to see if it is a request for loading a device driver, loading a file system or other configuration command 1405, 1411.

If the command was for loading a device driver, the OS2KRNL initialization process will load the named device driver into memory 1406. Upon completion, the device driver is called to initialize itself and the hardware it supports 1407. If the device driver cannot acquire sufficient memory or if it detects that the hardware is malfunctioning, it returns a failure indication. Otherwise it returns a success indication.

If OS2KRNL receives a success indication, it will create a DPB with the DPB→DPB_DRIVER_ADDR field pointing at a control block in the device driver data 1409. This DPB is then added to the system list 1409.

OS2KRNL can now, through its normal services, access the device driver and the device driver is ready to perform its normal services.

If the command was for loading a file system, the OS2KRNL initialization process will load the named file system into memory 1450. Upon completion, the file system is called to initialize itself 1451. If the file system cannot acquire sufficient memory or if it cannot find a device driver that it may require, it returns a failure indication. Otherwise it returns a success indication.

If OS2KRNL receives a success indication, it will create an FSC from the control information used to load the file system 1453. If the name of the file system (FSC→FS_NAME) is the same as the name of the mini file system 1454, the mini file system's FSC is removed from the system's list 1455. Finally, the new FSC is added to the system's list 1456.

OS2KRNL can now, through its normal application calls, access all media that have a data storage organization understandable only by the newly loaded file system.

Other configuration commands are processed in the manner peculiar to the operating system 1410.

When all configuration commands are processed 1403, the OS2KRNL initialization process is completed.

Figure 15:
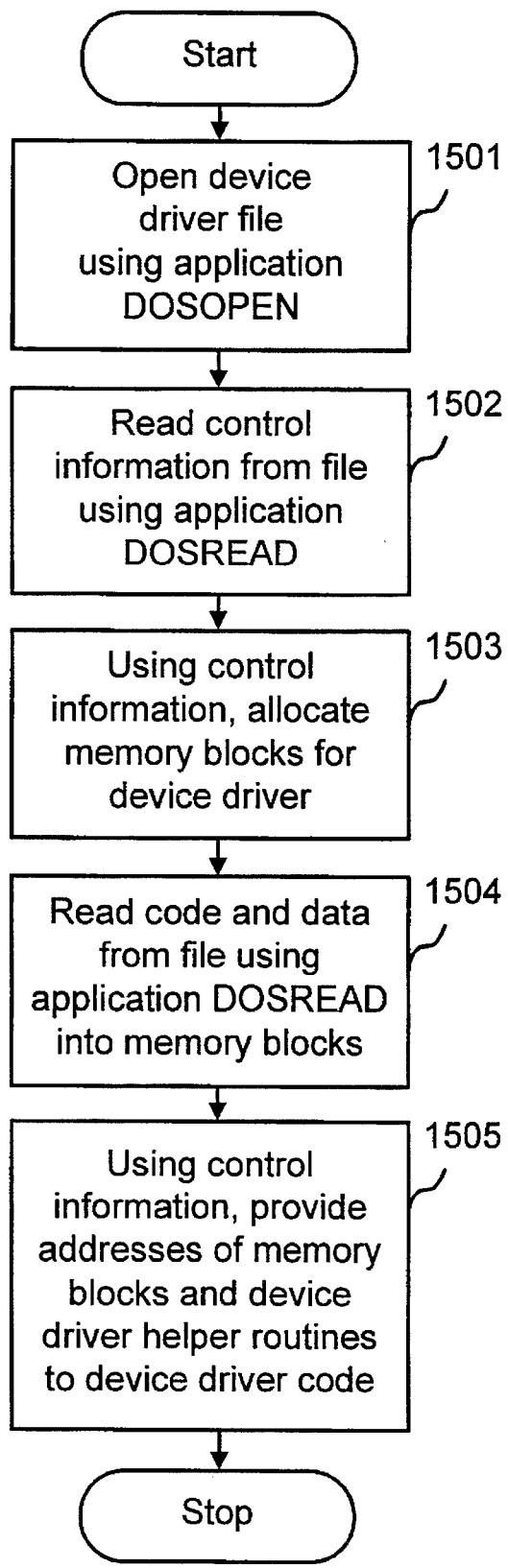
FIG. 15 is a flow diagram detailing the loading of device drivers in accordance with the present invention.

FIG. 15 details the steps necessary to loading a device driver. First, the device driver file is opened by OS2KRNL by using the application DosOpen call 1501.

Control information is read from the opened device driver file using the application DosRead call 1502.

Using this control information, memory blocks are allocated 1503, and code and data are read from the device driver file into the memory blocks using the application DosRead call 1504.

The control information is used again to provide addresses of these memory blocks to the device driver code as well as providing the addresses of OS2KRNL device driver helper routines to the device driver code 1505.

At this point, the device driver is callable by OS2KRNL for initialization.

Figure 16:
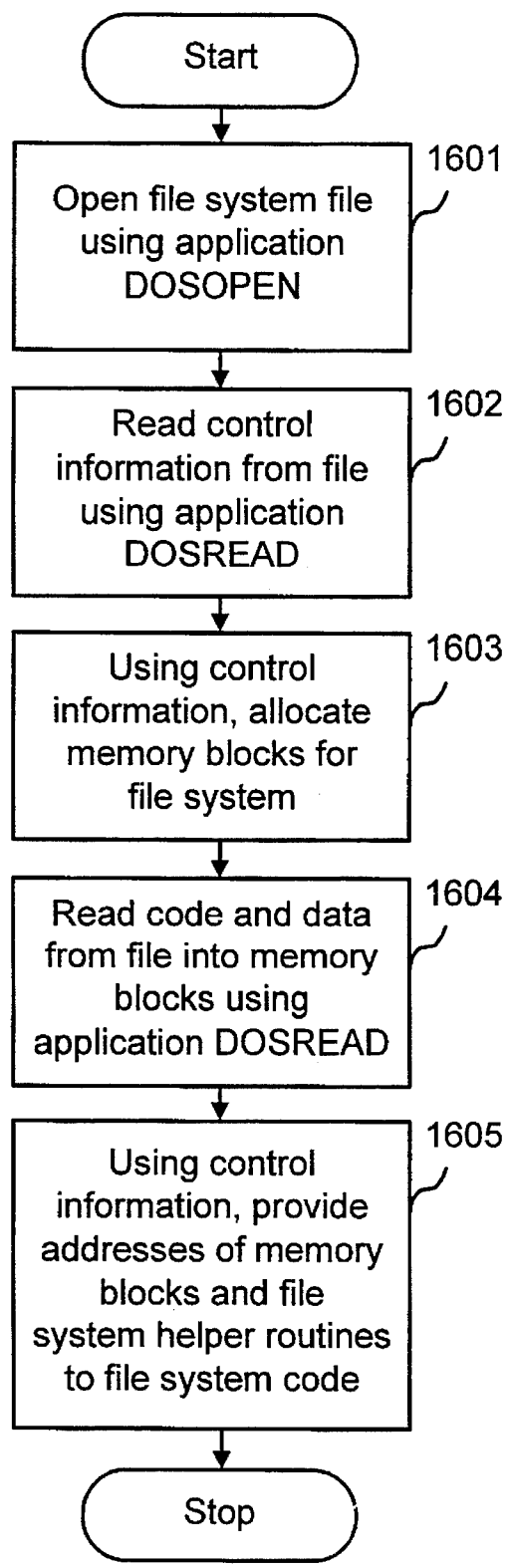
FIG. 16 is a flow diagram detailing the loading of file systems in accordance with the present invention.

File system loading, in FIG. 16, proceeds along the same lines. The file system file is opened using application DosOpen call 1601.

Control information is read from the opened file system file using the application DosRead call 1602.

Using this control information, memory blocks are allocated 1603, and code and data are read from the file system file into the memory blocks using the application DosRead call 1604.

The control information is used again to provide addresses of these memory blocks to the file system code as well as providing the addresses of OS2KRNL file system helper routines to the file system code 1605.

At this point, the file system is callable by OS2KRNL for initialization. The control information further details the addresses of routines required to fill in the FSC above in FIG. 14b, 1453.

Figure 17:
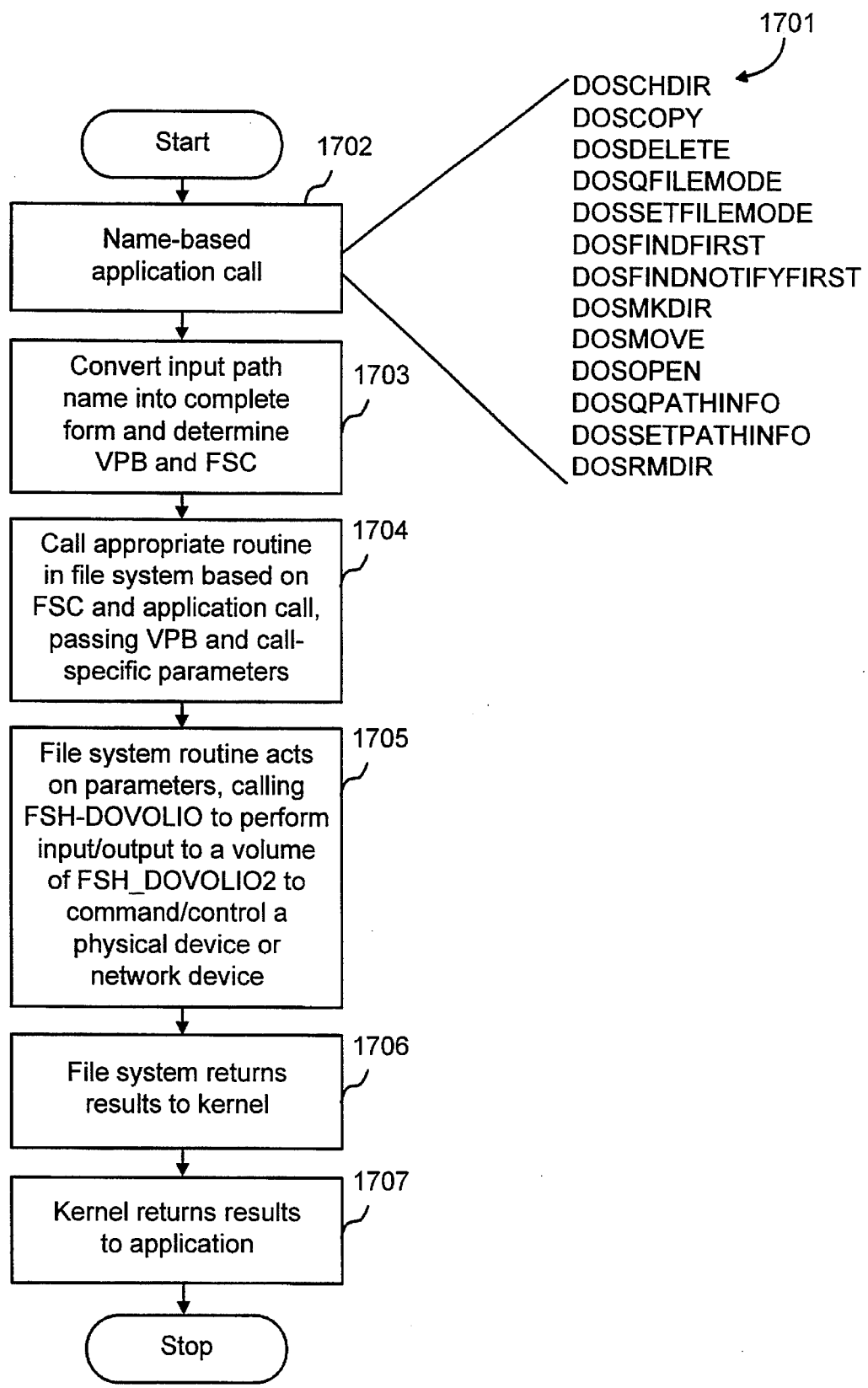
FIG. 17 is a flow diagram skeleton detailing the execution of name-based operations in accordance with the present invention.

Now, when an application (or OS2KRNL initialization process) wishes to retrieve or store data on a particular medium, it begins by issuing a name-based system call (FIG. 17), so named because the application passes in the path name of the object it wishes to retrieve or store. Along with this path name, the application will pass additional data (e.g., in the case of DosOpen, it is the specific access that the application desires).

Upon receipt of this call 1702, the kernel will convert the input path name into a complete form 1703; the kernel will track certain "default" information so as to relieve the application and operator of the burden of specifying the full content. As part of this process, the kernel will identify the VPB of the volume to which the specific call refers as well as the FSC of the file system that understands the volume's data organization.

Having determined the FSC and VPB, the kernel will then call the appropriate routine 1704, based upon the application request, whose address is available in the FSC, passing to said routine the VPB and other parameters that were provided by the application. For example, the routine FSC→ FS_OPEN is called passing in the fully formed name, the VPB, and the access mode desired by the application.

The called routine in the file system will consult its internal data 1705 and may perform further input/output to the volume in order to process the application's request. If the file system wishes to perform input or output to a volume, it will call the FSH_DOVOLIO helper, passing the VPB, an indicator of whether a read or a write is expected to occur, a pointer to memory, the number of sectors of data to transfer, and a logical sector number on the media where the transfer is expected to begin. If the file system wishes to command or control a physical device or a network device, as in the case of remote media, it will call the FSH_DOVOLIO2 helper, passing a command indicator, the VPB, and a pointer to memory.

Upon completion of the operation, the file system will return the appropriate results back to the kernel 1706. The kernel will return the results as appropriate back to the application 1707.

The above-described skeleton is used to implement all application service calls that pass in a file system path name. The present invention does not limit the name-based calls to those listed 1701, but other application calls whose primary object is named through a path name.

Figure 18A:
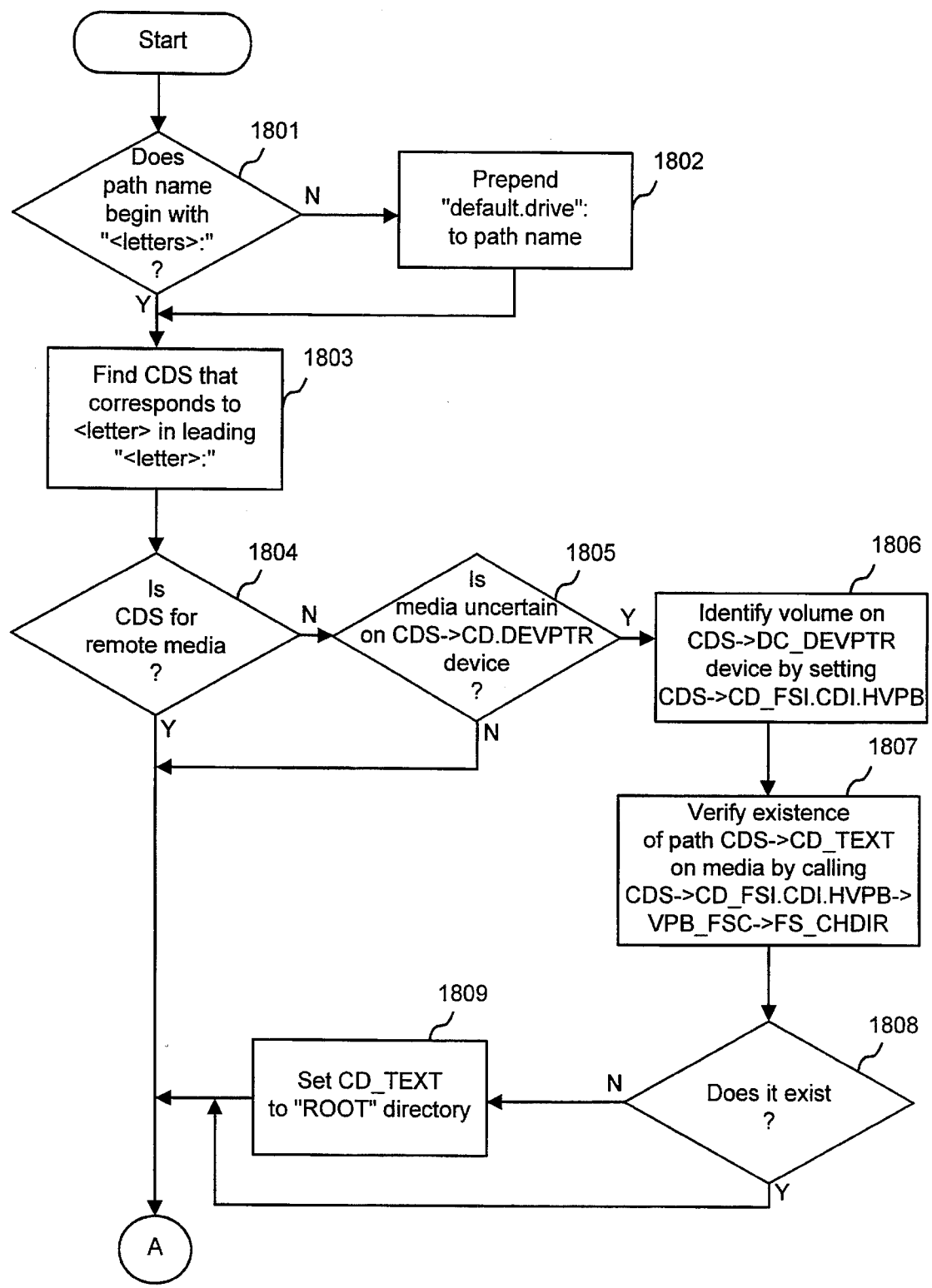
FIGS. 18A and 18B are a flow diagram detailing the path name conversion process invoked by the name-based operations in accordance with the present invention.
Figure 18B:
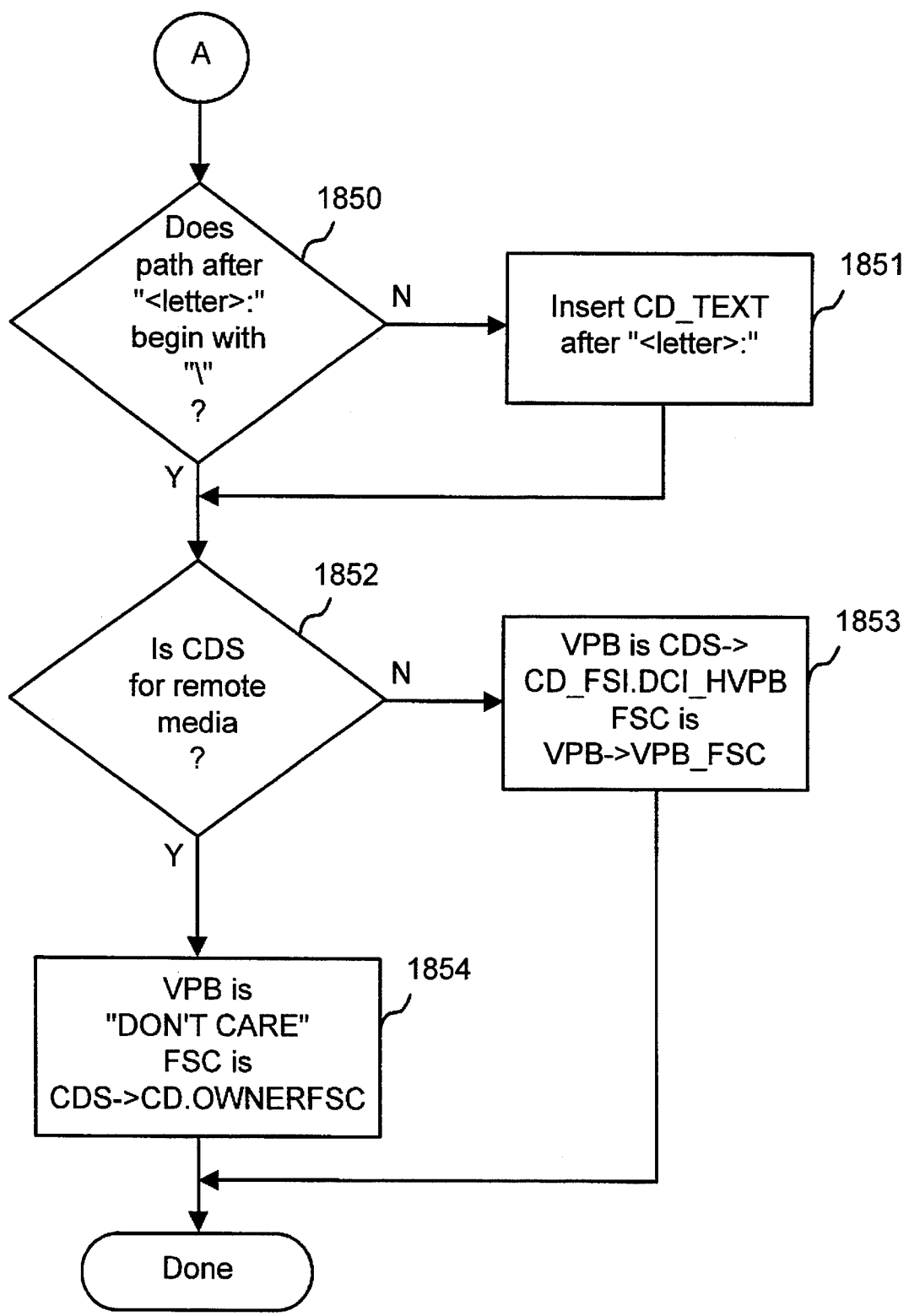

The actual conversion of the path name from the application-specified form into the complete form is detailed in FIG. 18.

First, the path name is examined to see if it begins with a single letter followed by a colon 1801. If there is none, then the default "drive" followed by a colon is prepended to the application's path name 1802. This assures that there will always be a logical drive specified in the complete path name.

Next, the leading drive letter is used to retrieve a corresponding CDS 1803. Typically, the CDS's are stored as an ordered set. Logical drive 'A' refers to the first CDS in the set; 'B' refers to the second CDS in the set and so on.

The CDS is now tested to make sure it is up to date. This means that if the CDS refers to a physical device, there is a VPB for the volume in that device and that the "default directory" does indeed exist on that drive.

This is accomplished as follows. If the CDS is for remote media, it is by definition up to date. If it is local, the device driver, as pointed to via CDS→ CD_DEVPTR→DPB_DRIVER_ADDR, is probed to see if the media is uncertain 1805. If it is not uncertain, the CDS must be up to date.

If the media is uncertain, the kernel identifies the volume in that physical device by generating a VPB and storing that VPB into CDS→CD_FSI.CDI_HVPB 1806.

The file system recognizing that volume is then asked to verify the "default directory" 1807. This is accomplished by retrieving the FSC from the found VPB and calling the FS_CHDIR routine passing the text of the "default directory." If the directory does not exist, the "default directory" is then set to be the "root" 1809, which is guaranteed to exist on all file systems.

At this point, the CDS is considered to be completely up to date.

The application path name is examined to see if there is a backslash ('\') immediately following the colon after the logical drive letter 1850. Presence of the backslash indicates that the path specified is complete from the root. If it is absent, the "default directory" from the CDS is inserted following the colon 1851.

At this point, the path name is complete as it contains a logical drive as well as a complete directory specification.

The final step in path name conversion is the identification of the VPB for the volume and the FSC of the file system that is expected to process the appropriate application call. If the CDS is for remote media, tested at 1852, the VPB is a "don't care" value since the VPB refers ONLY to local media and the FSC is CDS→CD_OWNERFSC 1854. If the CDS is for local media, the VPB is CDS→CD_FSI.CDI_HVPB and the FSC is VPB→VPB_FSC 1853.

To identify the media in a particular physical device, given a DPB (FIG. 19), the following steps are undertaken: First, sole access to the DPB as well as DPB→ DPB_HVPB is obtained via the use of the semaphores in the DPB and VPB structures 1901. This is to assure that only one application is identifying a volume at a time. Since the operating system may be multitasking or multiprocessing, it is possible that two applications may be identifying the same volume at the same time and generating inconsistencies in the data structures. Use of these semaphores assures that these inconsistences do not occur.

The kernel then informs the device driver through DPB→ DPB_DRIVER_ADDR that any uncertain media condition no longer exists 1902 since the kernel has exclusive access to the DPB and is in the process of identifying the volume.

A new VPB is created 1903. It is expected that this VPB will be filled in later by a recognizing file system with all information identifying and describing the volume.

The first sector on the media is then read into a temporary buffer 1904. This is provided as an aid to device drivers and file systems to store information describing the volume. However, file systems and device drivers are not required to store such information as long as they can provide such information through other input/output operations.

Once this sector is obtained, the device driver, through DPB→DPB_DRIVER_ADDR, is allowed to examine the buffer and adapt itself to the new media 1905.

Now, all installed file systems are asked to recognize the volume on the drive. This is performed by enumerating FSC's 1906 and calling FSC→FS_MOUNT to recognize the media based upon the first sector 1907. Successful recognition 1908 also means that the file system will initialize the VPB to uniquely identify the volume by obtaining the volume identifier from the volume and storing it in VPB→VPB_FSI.VPI_ID.

If no file system recognizes the volume, the preferred embodiment will cause a "default" file system 1909 to recognize the volume. This may occur by having a file system that recognizes all media be the last FSC that is asked to mount the media.

The kernel now has a VPB that identifies the media and a file system that recognizes said media. The kernel sets VPB→VPB_FSC to point to the FSC for the file system that recognizes the media 1950.

A potential problem may exist in the case of removing a medium from a physical drive and then reinserting it. This situation will cause the kernel to have two VPB's for the same volume. Since there is expected to be exactly one VPB per volume, this situation must be addressed.

The volume recognition process will search the remainder of the VPB's in the system to see if there is one with the same VPB→VPB_FSI.VPI_ID 1951. Since this volume identifier is expected to uniquely identify a volume, existence of another VPB with the same identifier indicates the duplicate case.

When such a duplicate is found, the file system, via VPB→VPB_FSC→FS_MOUNT, is called to unmount media given the newly recognized VPB and the kernel then destroys the new VPB 1952. Then DPB→DPB_HVPB is set to point to the preexisting VPB 1953.

If no duplicate is found, the new VPB is added to the system list and DPB→DPB_HVPB is set to point to the new VPB 1954.

Finally, the semaphores of the DPB and the previous VPB are released 1955, allowing other applications to access the physical device and volume as the media in the physical device is completely identified by DPB→DPB_HVPB pointing to a VPB that is uniquely identified with the volume.

Figure 20:
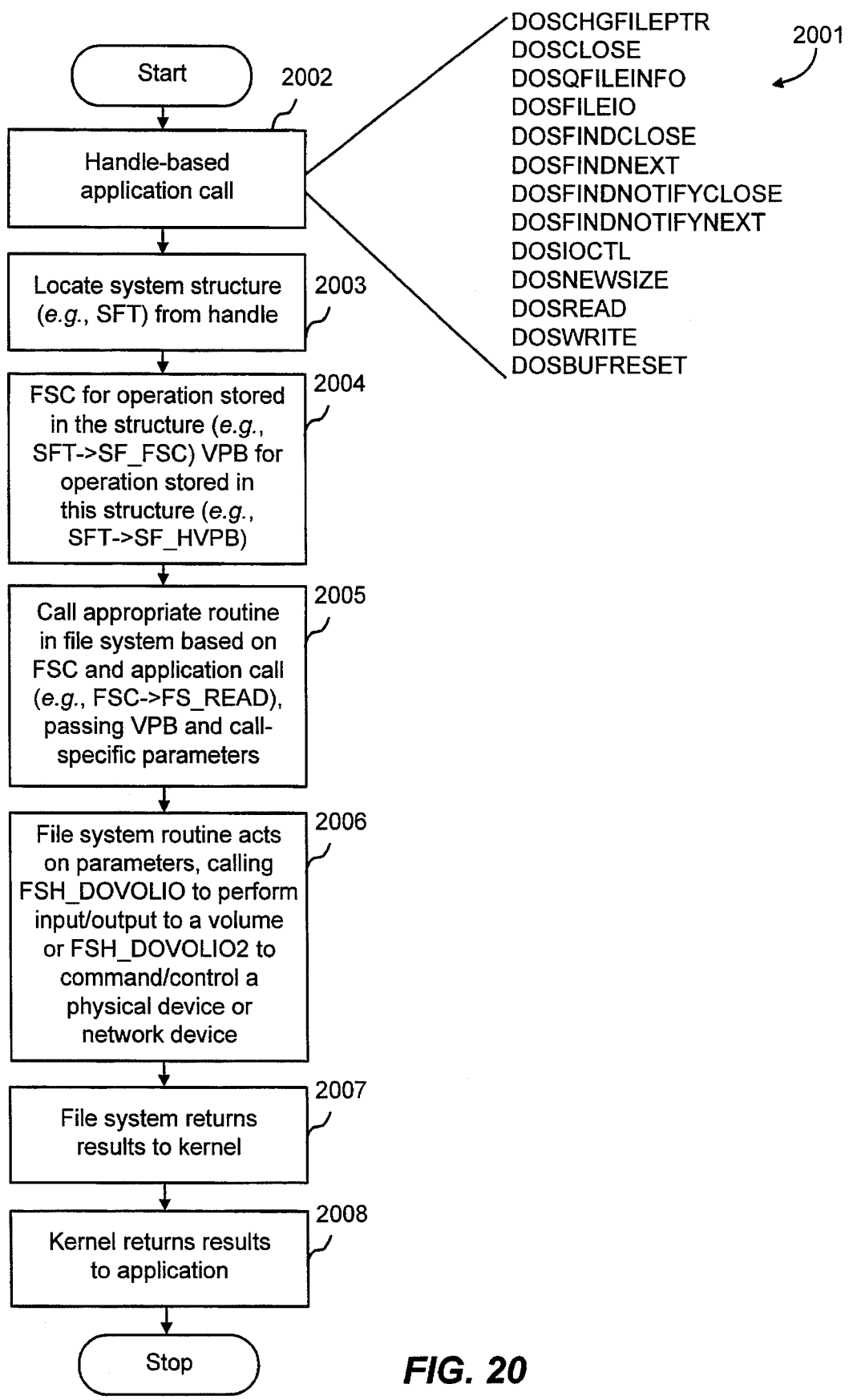
FIG. 20 is a flow diagram skeleton detailing the execution of handle-based operations in accordance with the present invention.
Figure 21:
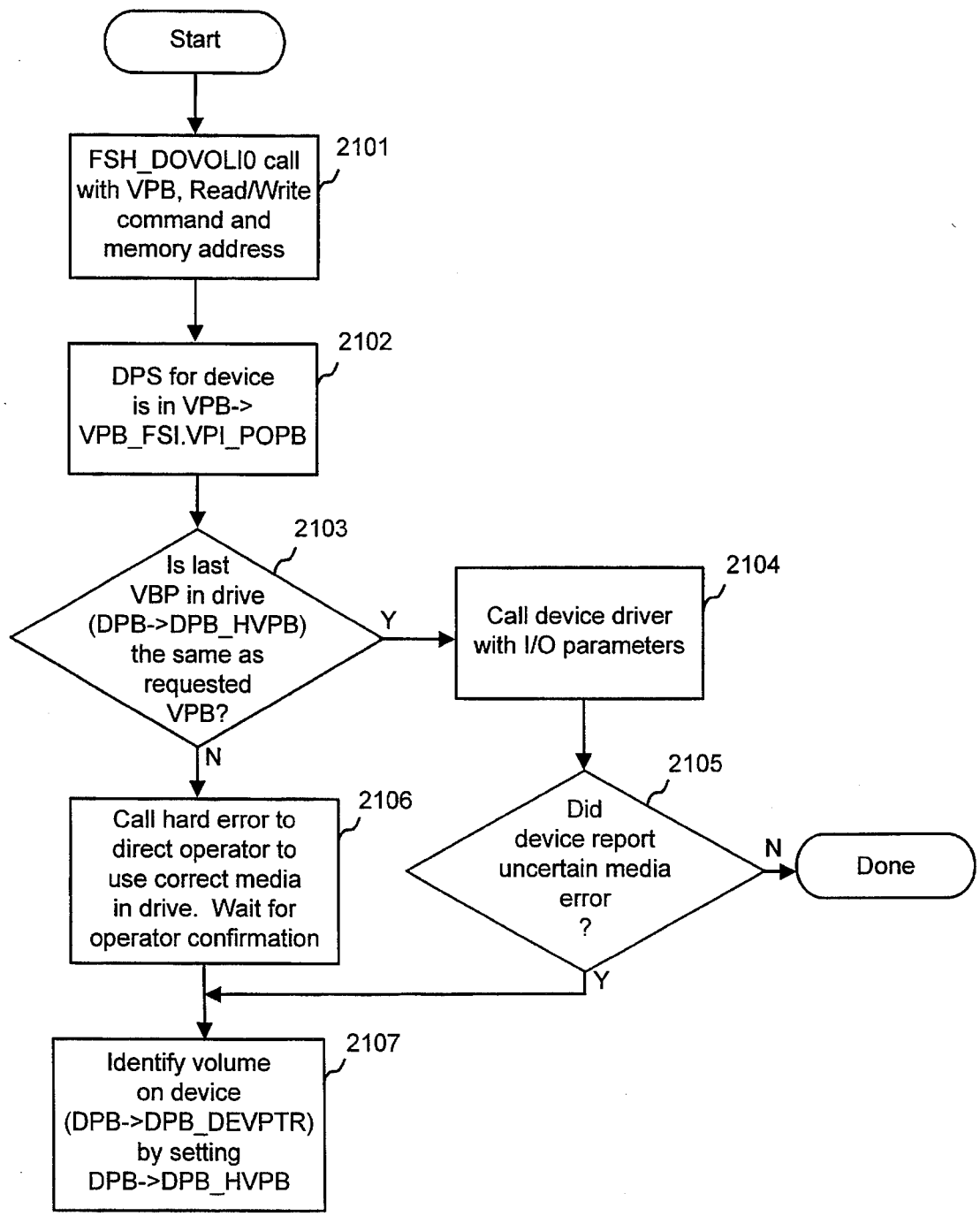
FIG. 21 is a flow diagram of the FSH_DOVOLIO process invoked by the processes described in conjunction with FIGS. 17 and 20.

When an application has initiated an ongoing operation via a name-based call, such as DosOpen, and wishes to continue the operation, such as DosRead, it issues a handle-based call (FIG. 20). This call is so named because of the "handle" or token passed by the application to the kernel. Such token is returned to the user by a previous name-based call, such as the file handle returned via DosOpen.

Upon receipt of such a call 2002, the kernel will locate the appropriate system data structure associated with the handle 2003, such as the SFT for a file given an open file handle. All such structures will have stored in their fields both the VPB of the volume where the file data is stored and the FSC that understands the data organization on the media. In the case of remote media, such VPB's will have a "don't care" value.

The kernel will now identify the VPB and FSC from the system structure, based upon the type of structure 2004.

Having determined the FSC and VPB, the kernel will then call the appropriate routine 2005, based upon the application request, whose address is available in the FSC, passing to said routine the VPB and other parameters that were provided by the application. For example, the routine FSC→ FS_READ is called passing in a pointer to the SFT, the VPB, a pointer to memory, and the count of bytes of data to transfer from media to memory.

The called routine in the file system will consult its internal data 2006 and may perform further input/output to the volume in order to process the application's request. If the file system wishes to perform input or output to a volume, it will call the FSH_DOVOLIO helper, passing the VPB, an indicator of whether a read or a write is expected to occur, a pointer to memory, the number of sectors of data to transfer, and a logical sector number on the media where the transfer is expected to begin. If the file system wishes to command or control a physical device or a network device, as in the case of remote media, it will call the FSH_ DOVOLIO2 helper, passing a command indicator, the VPB, and a pointer to memory.

Upon completion of the operation, the file system will return the appropriate results back to the kernel 2007. The kernel will return the results as appropriate back to the application 2008.

The above-described skeleton is used to implement all application service calls that pass in a "handle" as returned by a previously issued name-based application call. The present invention does not limit the handle-based calls to the listed set 2001. Any call that accesses an ongoing operation to an object managed by a file system can be dealt with.

Figure 12:
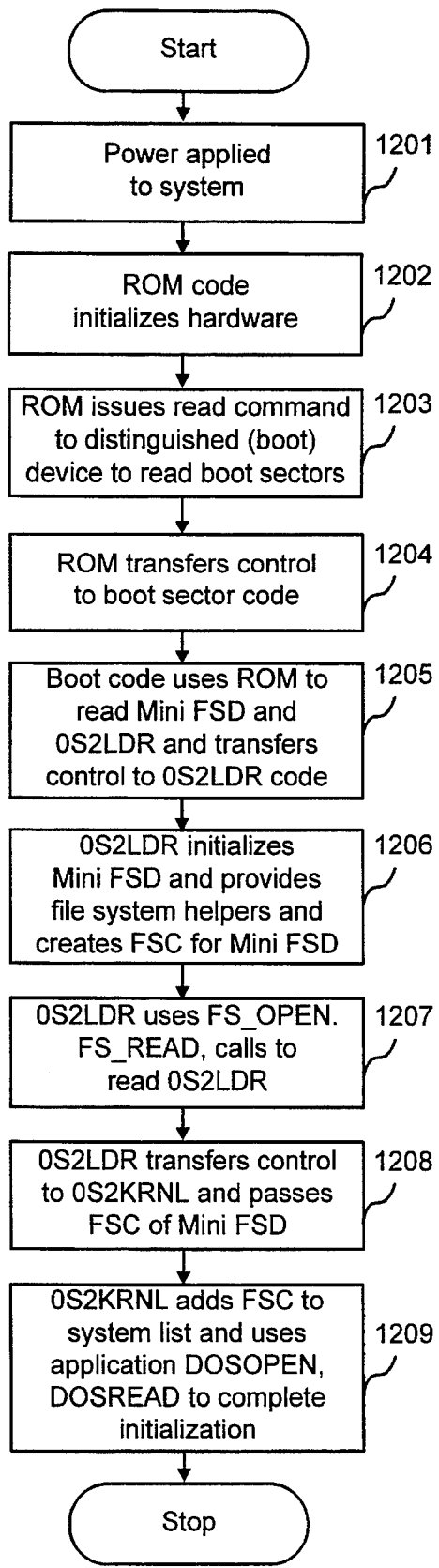
FIG. 12 is a flow diagram detailing the overall operation of system initialization from local media in accordance with the present invention.

When requested to perform input/output to/from a volume 2101, FSH_DOVOLIO must assure that the request is actually performed on the correct volume (FIG. 12).

The DPB for the physical device is located in VPB→ VPB_PDPB given the VPB pointer that the file system passes in the FSH_DOVOLIO call 2102.

Before issuing the read or write command to the physical device, FSH_DOVOLIO checks to see if the volume for which the command is to be issued is believed to be present in the physical device 2103. This is accomplished by checking to see if the contents of the DPB→DPB_HVPB field are the same as the pointer to the VPB passed with the FSH_ DOVOLIO call.

If they are not the same, an error procedure is called to inform the operator of this problem and await confirmation that the situation has been rectified 2106, ostensibly by the insertion of the correct medium into the physical device.

Figure 19A:
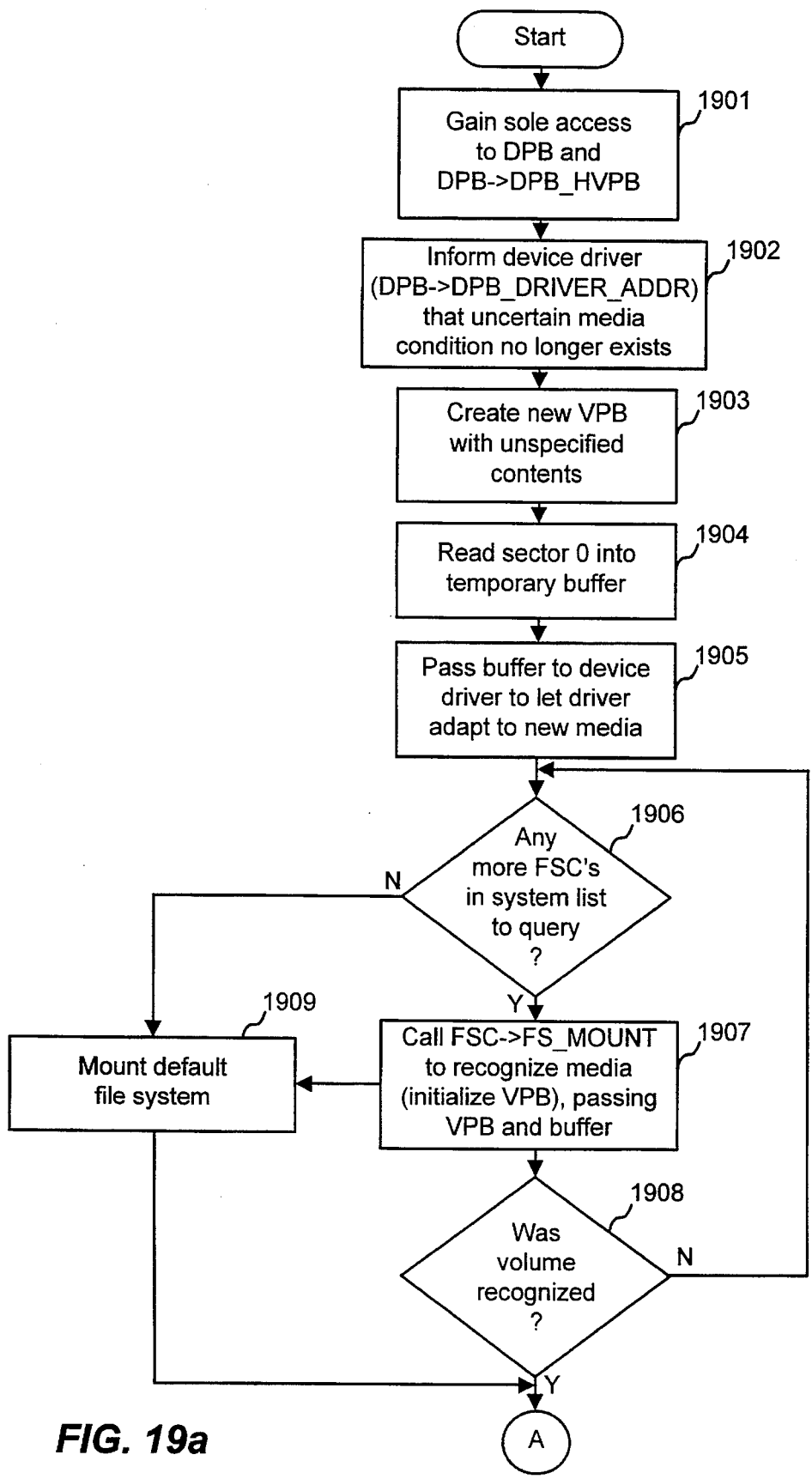
FIGS. 19A and 19B are a flow diagram detailing the volume identification process invoked both by the path name conversion process and by the input/output operations in accordance with the present invention.
Figure 19B:
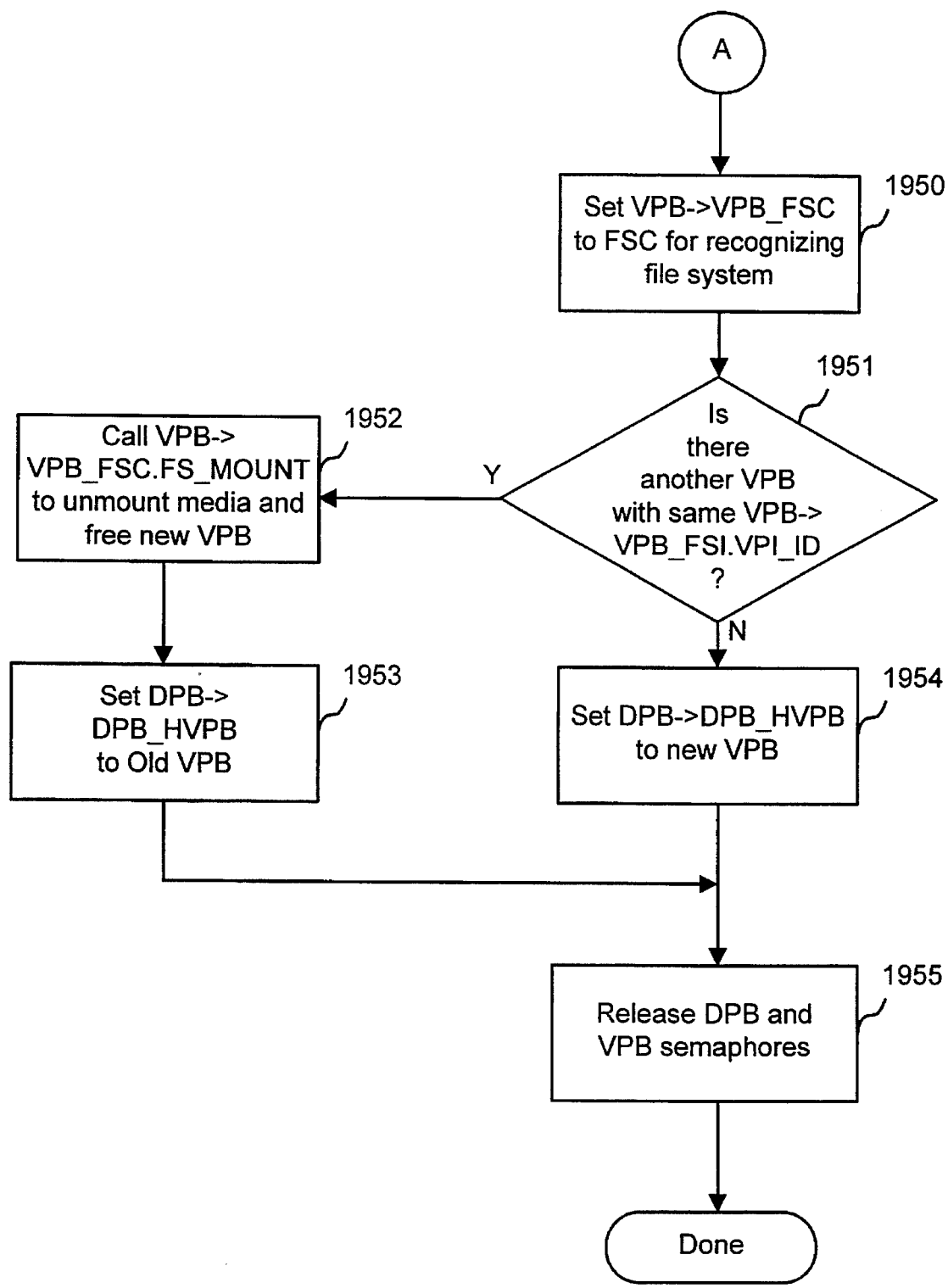

Receiving such confirmation, FSH_DOVOLIO identifies the medium on the device 2107 (see FIG. 19). Once the volume is identified (and DPB→DPB_HVPB set to reflect the ostensibly correct volume), FSH_DOVOLIO returns to the check above 2103 where the requested volume is compared against the volume currently known to be in the drive.

If the volume in the drive is the same as that included in the file system request, a call to the device driver via DPB→DPB_DRIVER_ADDR passing an indicator of whether a read or a write is expected to occur, a pointer to memory, the number of sectors of data to transfer, and a logical sector number on the media where the transfer is expected to begin 2104.

The device driver may successfully complete the operation or it may detect that there is some problem with the physical device or medium. In either of these cases, the results of the device driver operation are returned to the called of FSH_DOVOLIO.

The device driver may detect, however, that the medium in the physical device is uncertain. This may occur because the physical device has a latch that the operator must toggle in order to insert/remove the medium or because the time elapsed since the last successful access to the medium is longer than the time it takes an operator to change media. In either of these cases, the device driver will return a media-uncertain error to the call from FSH_DOVOLIO. This error return is detected 2105, and FSH_DOVOLIO returns to the state above where it identifies the volume that is now in the physical device.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A method for loading an operating system in a computer system, the operating system for controlling computer system processes, the computer system including memory in which code can be stored, the computer system in communication with secondary storage in which code can be stored, the method comprising the steps of:

executing bootstrap program commands from the memory which uses a first file system which is also in the memory, the first file system having an association of operating system files to locations in secondary storage that contain operating system files in order to:

obtain from the association the location in secondary storage of at least one operating system file; and transfer the operating system file into memory from the obtained location in secondary storage.

2. A method as claimed in claim 1 wherein the computer system memory includes read-only memory (ROM) and main memory, the bootstrap program commands having a first portion and a second portion, the ROM storing the first portion of the bootstrap program commands, the method further including the step of first executing the first portion of the bootstrap program commands stored in the ROM to transfer the second portion of the bootstrap program commands and the first file system from secondary storage to main memory.

3. A method as claimed in claim 1 wherein the computer system memory includes read-only memory (ROM) and main memory, the bootstrap program commands having a first portion and a second portion, the ROM storing the first portion of the bootstrap program commands, the method further including the steps of first executing the first portion of the bootstrap program commands stored in the ROM to transfer the second portion of the bootstrap program commands from secondary storage to main memory, and using the transferred second portion of the bootstrap program commands to transfer the first file system from secondary storage to main memory.

4. A method as claimed in claim 1 wherein the computer system memory includes read-only memory (ROM) and main memory, the bootstrap program commands having a first portion and a second portion, the ROM storing the first portion of the bootstrap program commands, the method further including the steps of first executing the first portion of the bootstrap program commands stored in the ROM to transfer the first file system from secondary storage to main memory and under control of the first file system, obtaining from the association the location in secondary storage of the second portion of the bootstrap program commands; and transferring the second portion of the bootstrap program from the obtained location in secondary storage.

5. The method of claim 1 further including the steps of:

executing the operating system to use the first file system to transfer a second file system from secondary storage to memory; and using the second file system to transfer operating system files not transferred from secondary storage to memory by the first file system during the operating system loading process.

6. The method of claim 5 further including the steps of:

executing the operating system to use the second file system to transfer a third file system from secondary storage to memory; and using one of the second or the third file systems in memory to transfer operating system files not transferred from secondary storage to memory by the first file system during the operating system loading process.

7. The method of claim 5 wherein the computer system is also in communication with a disparate storage media that is different than the secondary storage from which the operating system file was transferred, and wherein the method further includes the steps of:

executing the operating system to use the second file system to transfer a disparate device driver from secondary storage into memory, the disparate device driver being associated with the disparate storage media; and using the second file system, in conjunction with the disparate device driver, to transfer operating system files not transferred by the first file system from the disparate storage media during the operating system loading process.

8. The method of claim 5 wherein the computer system is also in communication with a disparate storage media that is different than the secondary storage from which the operating system file was transferred, and wherein the method further includes the steps of:

executing the operating system to use the first file system to transfer a disparate device driver from secondary storage into memory, the disparate device driver being associated with the disparate storage media; and using the second file system, in conjunction with the disparate device driver, to transfer operating system files not transferred by the first file system from the disparate storage media during the operating system loading process.

9. The method of claim 5 further including the steps of:

executing the operating system to use the second file system to transfer a configuration file from secondary storage to memory, the configuration file including data identifying file system drivers and file systems associated with the operating system; and continuing execution of the operating system to use the configuration file data and the second file system to transfer the identified file system drivers and file systems into memory.

10. The method of claim 1 further including the steps of:

executing the operating system to use the first file system to transfer a configuration file from secondary storage to memory, the configuration file including data identifying file system drivers and file systems associated with the operating system; and continuing execution of the operating system to use the configuration file data and the first file system to transfer the identified file system drivers and file systems into memory.

11. A method as claimed in claim 1, 2, 3, 4, 5, 6, 7, 8, 10 or 9 wherein the computer system is in communication with secondary storage via a network connection, and wherein each step of transferring code from secondary storage to memory includes the step of requesting and obtaining the code over the network connection.

12. A method in a computer system for loading an operating system into memory through use of a file system, the file system being stored on secondary storage, the operating system being stored on secondary storage as files, each file having a file name, the method comprising the steps of:

under control of a bootstrap program,
before loading the operating system, loading the file system from secondary storage into memory, the file system being stored at locations in secondary storage that are known to the bootstrap program, the file system having a mapping of file names of operating system files to locations in secondary storage that contain the operating system files; and requesting the loaded file system to load at least one operating system file by specifying the file name of the operating system file to be loaded; and under control of the loaded file system,
in response to the request, retrieving from the mapping the location in secondary storage of the operating system file specified by the file name; and loading the operating system file into memory from the retrieved location of secondary storage.

13. The method according to claim 12 wherein the file system and the operating system file are stored in different secondary storage devices.

14. The method according to claim 12 further comprising the step of executing the operating system contained in the loaded operating system file whereby the operating system uses the loaded file system to access additional files.

15. The method according to claim 12 wherein the bootstrap program includes a memory management function for allocating memory and the method further includes the step of requesting the bootstrap program to allocate a portion of memory for loading the operating system file.

16. A computer system capable of loading an operating system by using a file system, comprising:

memory and secondary storage in which data can be stored;

communication means connecting the memory and secondary storage so that data can be transferred therebetween;

a processing unit for controlling the execution of program code in the memory, including the execution of an operating system which controls the overall computer system operation;

a first file system having an association of operating system files to locations in secondary storage that contain operating system files and including a set of data access capabilities for transferring data into memory from secondary storage;

a bootstrap program including commands for requesting the first file system to locate at least one operating system file in secondary storage and for executing the first file system, such that the data access capabilities of the first file system are used by the bootstrap program to transfer the at least one operating system file from secondary storage into the memory via the communication means, whereby the transferred operating system file can be executed by the processing unit.

17. A computer system as claimed in claim 16 wherein the memory includes read-only memory (ROM) and main memory, the bootstrap program has a first portion and a second portion, and the first portion of the bootstrap program is stored in the ROM, the system further including: means for executing the first portion of the bootstrap program stored in the ROM to transfer the second portion of the bootstrap program and the first file system from secondary storage to main memory prior to the execution of the transferred second portion of the bootstrap program.

18. A computer system as claimed in claim 16 further including a second file system in secondary storage, and wherein the operating system is executed to use the first file system to transfer the second file system from secondary storage to memory, whereby the second file system can then be used by the operating system to transfer operating system files not transferred from secondary storage to memory by the first file system during the operating system loading process.

19. A computer system as claimed in claim 16 further including a configuration file in secondary storage, the configuration file including data identifying file system drivers and file systems associated with the operating system; and wherein the operating system is executed to use the first file system to transfer the configuration file into memory and using the configuration file data and the first file system to transfer the identified file system drivers and file systems into memory.

20. A computer system as claimed in claim 16 wherein the communication means is a network connection.

* * * * *

UNITED STATES PATENT AND TRADEMARK OFFICE
CERTIFICATE OF CORRECTION

PATENT NO. : 5,497,492
DATED : March 5, 1996
INVENTOR(S) : Mark J. Zbikowski, Alan R. Whitney, Rajen J. Shah, Bryan M. Willman and J. Gordon Letwin It is certified that error appears in the above-indentified patent and that said Letters Patent is hereby corrected as shown below:

On the title page, & Col. 1, line 3:

In Item [54], denoting the title, please delete "FIRE" and insert -- FILE --.

Signed and Sealed this

Eighth Day of October, 1996

Attest:

BRUCE LEHMAN

Attesting Officer   Commissioner of Patents and Trademarks